(12) United States Patent
Snell

(10) Patent No.: US 9,619,840 B2
(45) Date of Patent: Apr. 11, 2017

(54) BACKING MANAGEMENT

(71) Applicant: nCino, Inc., Wilmington, NC (US)

(72) Inventor: Nathan Snell, Wilmington, NC (US)

(73) Assignee: NCINO, INC., Wilmington, NC (US)

( * ) Notice: Subject to any disclaimer, the term of this patent is extended or adjusted under 35 U.S.C. 154(b) by 0 days.

(21) Appl. No.: 15/017,339

(22) Filed: Feb. 5, 2016

(65) Prior Publication Data

US 2016/0171613 A1 Jun. 16, 2016

Related U.S. Application Data

(63) Continuation-in-part of application No. 14/848,119, filed on Sep. 8, 2015, now Pat. No. 9,418,116.

(60) Provisional application No. 62/047,474, filed on Sep. 8, 2014.

(51) Int. Cl.
*G06F 17/30* (2006.01)
*G06Q 40/06* (2012.01)
*G06Q 10/06* (2012.01)

(52) U.S. Cl.
CPC ....... *G06Q 40/06* (2013.01); *G06F 17/30991* (2013.01); *G06F 17/30994* (2013.01); *G06Q 10/06312* (2013.01); *G06Q 10/0635* (2013.01)

(58) Field of Classification Search
CPC ......... G06F 17/30011; G06F 17/30371; G06F 17/246; G06Q 40/06; G06Q 40/02; G06Q 10/0635
USPC .................................................. 707/769, 770
See application file for complete search history.

(56) References Cited

U.S. PATENT DOCUMENTS

| | | | |
|---|---|---|---|
| 7,822,680 B1 * | 10/2010 | Weber | G06Q 40/00 705/35 |
| 8,572,083 B1 | 10/2013 | Snell et al. | |
| 8,676,689 B1 * | 3/2014 | Whelan | G06Q 40/12 705/36 R |
| 8,762,376 B2 | 6/2014 | Snell et al. | |
| 9,082,151 B2 | 7/2015 | Snell et al. | |
| 9,098,875 B2 | 8/2015 | Snell et al. | |
| 9,268,819 B1 | 2/2016 | Snell et al. | |
| 2002/0007332 A1 * | 1/2002 | Johnson | G06Q 40/02 705/36 R |
| 2004/0039666 A1 * | 2/2004 | Fudali | G06Q 40/00 705/35 |
| 2004/0158520 A1 * | 8/2004 | Noh | G06Q 40/025 705/38 |
| 2005/0027651 A1 * | 2/2005 | DeVault | G06Q 10/10 705/38 |
| 2005/0065871 A1 * | 3/2005 | Gerhart | G06Q 40/025 705/38 |
| 2006/0047600 A1 * | 3/2006 | Bodenheim | G06Q 40/02 705/40 |
| 2006/0106693 A1 * | 5/2006 | Carlson | G06Q 20/04 705/35 |

(Continued)

OTHER PUBLICATIONS

U.S. Appl. No. 61/714,647, filed Oct. 16, 2012, all pages.

(Continued)

*Primary Examiner* — Thanh-Ha Dang
(74) *Attorney, Agent, or Firm* — Kilpatrick Townsend & Stockton LLP

(57) ABSTRACT

Techniques described herein relate to integrating processes of resource requests and corresponding backings. More specifically, backing data is assessed to identify a distribution to be used for resource-request processing.

20 Claims, 22 Drawing Sheets

(56) References Cited

U.S. PATENT DOCUMENTS

| | | | |
|---|---|---|---|
| 2006/0106695 A1* | 5/2006 | Carlson | G06Q 20/24 705/35 |
| 2007/0011083 A1* | 1/2007 | Bird | G06Q 40/025 705/38 |
| 2007/0198401 A1* | 8/2007 | Kunz | G06Q 40/025 705/38 |
| 2009/0119229 A1* | 5/2009 | Fudali | G06Q 40/025 705/36 R |
| 2009/0187512 A1* | 7/2009 | Giroux | G06Q 40/06 705/36 T |
| 2010/0153827 A1* | 6/2010 | Koster | H04L 12/1868 714/799 |
| 2010/0274708 A1* | 10/2010 | Allen | G06Q 40/02 705/38 |
| 2010/0287092 A1* | 11/2010 | Colman | G06Q 40/025 705/38 |
| 2011/0112951 A1* | 5/2011 | Gould | G06Q 20/06 705/37 |
| 2011/0145164 A1* | 6/2011 | Lavoie | G06Q 30/0282 705/36 R |
| 2011/0161135 A1* | 6/2011 | Lee | G06Q 10/00 705/7.29 |
| 2013/0030985 A1* | 1/2013 | Shebesta | G06Q 40/02 705/38 |
| 2013/0080316 A1* | 3/2013 | Pawlusiak | G06Q 40/02 705/38 |
| 2013/0332862 A1* | 12/2013 | Mirra | G06Q 40/06 715/760 |
| 2014/0129411 A1* | 5/2014 | Fudali | G06Q 40/025 705/37 |
| 2015/0081591 A1* | 3/2015 | Chakar | G06Q 40/06 705/36 R |
| 2015/0248724 A1 | 9/2015 | Snell et al. | |

OTHER PUBLICATIONS

U.S. Appl. No. 61/652,970, filed May 30, 2012, all pages.
U.S. Appl. No. 61/652,977, filed May 30, 2012, all pages.
U.S. Appl. No. 61/792,011, filed Mar. 16, 2014, all pages.
U.S. Appl. No. 62/032,239, filed Aug. 2, 2015, all pages.
U.S. Appl. No. 62/102,196, filed Jan. 17, 2016, all pages.
U.S. Appl. No. 62/187,487, filed Jul. 1, 2015, all pages.

* cited by examiner

BACKING MANAGEMENT

This application is a continuation-in-part of nonprovisional U.S. patent application Ser. No. 14/848,119, filed Sep. 8, 2015, entitled "CAPTURING EVOLUTION OF A RESOURCE MEMORANDUM ACCORDING TO RESOURCE REQUESTS" that claims the benefit of priority to and is a nonprovisional of U.S. Provisional Patent Application No. 62/047,474, filed Sep. 8, 2014, entitled "VERSIONING AUDIT TRAIL SYSTEM FOR FINANCIAL INSTRUMENT REQUEST PROCESSING."

FIELD

Techniques described herein relate to integrating processes of resource requests and corresponding backings. More specifically, backing data is assessed to identify a distribution to be used for resource-request processing.

BACKGROUND

Processing resource requests can involve concurrent processing of backing data. However, identifying and processing backing data is complicated by diverse and incomplete backing assignment data. This diversity can be, in part, attributed to circumstances where multiple systems and devices provide backing data, which may frequently be incomplete in that provided backing data may lack corresponding backing-assignment data. Further, backing and resource requests may exhibit convergent and divergent relationships. Potential divergence with respect to a particular backing data set may complicate controlling how backing data is to be modified upon detecting changes corresponding to any single associated resource request. Further, traditional static storage of backing data may fail to account for a potential dynamic nature of the backing and to permit corresponding updates in one or more resource-request data sets.

SUMMARY

The present system teaches automatically managing backing for resource requests. The system comprises: a backing data store; a resource chronicle; and a backing manager, running on one or more processors. The backing manager is configured to retrieve: a resource value from the resource chronicle; a first backing from the resource chronicle; and first backing parameters from the backing data store. The backing manager is also configured to generate a first adjustment based on the first backing parameters. It also determines from the first backing parameters: a first backing value; a first ownership fraction, and a first available fraction of the first ownership fraction. The backing manager also retrieves a second backing from the resource chronicle and second backing parameters from the backing data store, and then generates a second adjustment based on the second backing parameters. It also determines from the second backing parameters: a second backing value; a second ownership fraction; and a second available fraction of the second ownership fraction. Then it transforms the first adjustment, the first backing value, the first ownership fraction, and the first available fraction into a first amount. And it transforms the second adjustment, the second backing value, the second ownership fraction, and the second available fraction into a second amount. The system also comprises a backing accumulator coupled to the backing manager, wherein the first amount is accumulated in the backing accumulator and the second amount is accumulated in the backing accumulator. Then the backing manager retrieves a predetermined rule associated with a resource request and compares the backing accumulator with the resource value to generate a compared value. It then analyzes the compared value to determine a compliance with the predetermined rule and stores the compliance in the resource chronicle.

The present computer processor implemented method also teaches automatically managing backing for resource requests, the method comprising. The method retrieves: a resource value from a resource chronicle; a first backing from the resource chronicle; first backing parameters from a backing data store; and a first adjustment based on the first backing parameters. The method then determines from the first backing parameters: a first backing value; a first ownership fraction; and a first available fraction of the first ownership fraction. The method then retrieves a second backing from the resource chronicle and second backing parameters from the backing data store. It further generates a second adjustment based on the second backing parameters. The method then determines from the second backing parameters: a second backing value; a second ownership fraction; and a second available fraction of the second ownership fraction. Then the method transforms: the first adjustment, the first backing value, the first ownership fraction, and the first available fraction into a first amount and the second adjustment, the second backing value, the second ownership fraction, and the second available fraction into a second amount. The method accumulates the first amount in a backing accumulator and the second amount in the backing accumulator. The method then retrieves a predetermined rule associated with a resource request; compares the backing accumulator with the resource value to generate a compared value; and analyzes the compared value to determine a compliance with the predetermined rule. Finally the method stores the compliance in the resource chronicle.

This non-transitory computer-readable medium having sets of instructions stored thereon also teaches automatically managing backing for resource requests. When the sets of instructions are executed by a computer, they cause the computer to retrieve: a resource value from a resource chronicle; a first backing from the resource chronicle; and a first backing parameters from a backing data store. When the sets of instructions are executed by a computer, they also cause the computer to generate a first adjustment based on the first backing parameters and to determine from the first backing parameters: a first backing value; a first ownership fraction; and a first available fraction of the first ownership fraction. When the sets of instructions are executed by a computer, they also cause the computer to retrieve a second backing from the resource chronicle and retrieve second backing parameters from the backing data store and then generate a second adjustment based on the second backing parameters. In addition when the sets of instructions are executed by a computer, they cause the computer to determine from the second backing parameters: a second backing value; a second ownership fraction; and a second available fraction of the second ownership fraction before they transform the first adjustment, the first backing value, the first ownership fraction, and the first available fraction into a first amount, and then transform the second adjustment, the second backing value, the second ownership fraction, and the second available fraction into a second amount. When the sets of instructions are executed by a computer, they also cause the computer to accumulate the first amount in a backing accumulator and accumulate the second amount in the backing accumulator. Then they cause the computer to retrieve a predetermined rule associated with a resource request and compare the backing accumulator with the resource value to generate a compared value before they analyze the compared value to determine a compliance with the predetermined rule, and store the compliance in the resource chronicle.

BRIEF DESCRIPTION OF THE DRAWINGS

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

The present disclosure is described in conjunction with the appended figures.

In the appended figures, similar backings and/or features may have the same reference label. Where the reference label is used in the specification, the description is applicable to any one of the similar backings having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
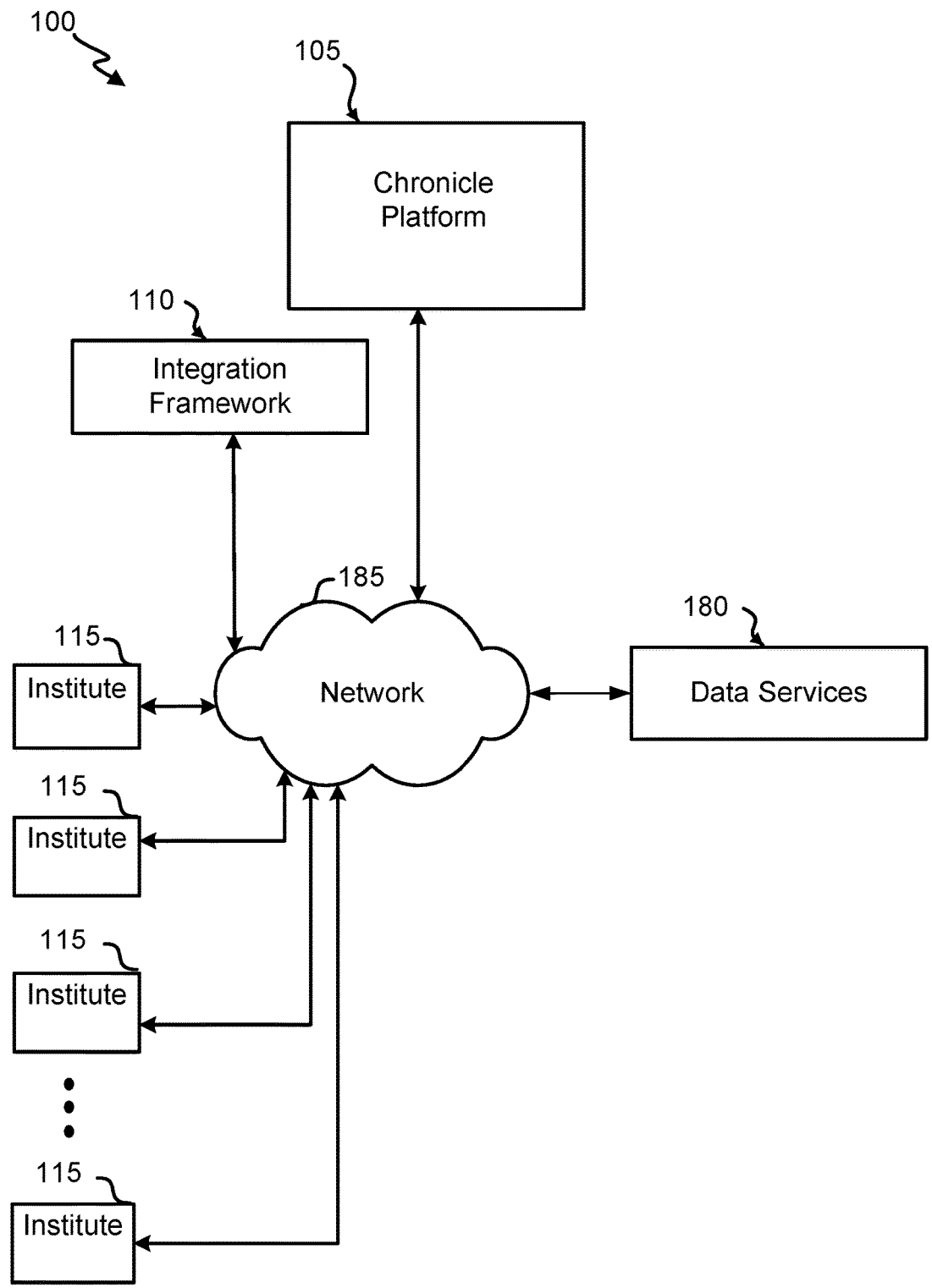
FIG. 1 depicts a block diagram of an embodiment of a chronicle system.

FIG. 1 depicts a block diagram of an embodiment of a chronicle system 100. This embodiment of the chronicle system 100 is built on a multitenant platform such as the Salesforce™ Force.com platform. The multitenant platform is used to provide services from one tenant to multiple unrelated tenants. Each institute 115 (banks, credit unions, etc.) is at least one tenant on the multitenant platform and each tenant uses services on the multitenant platform. A chronicle platform 105 and an integration framework 110 are each tenants on the multitenant platform that provide services to other tenants. An advantage of a multitenant platform is that it is unnecessary for tenants in the multitenant platform to be co-located and, as such, tenants can be separated geographically in some cases but share a geographic location in other cases. Another advantage of using a multitenant platform is that each of the institutes 115 tenants on the multitenant platform use the chronicle platform 105 and/or the integration framework 110 over a network 185 (a network is a system of computers and peripherals that are linked together and can consist of as few as two computing devices connected or millions of computers over a large geographical area with or without wires— such as the internet or the cellular telephone network) such that it is unnecessary for each of the institutes 115 to host their own chronicle platform 105 or integration framework 110. In other embodiments of the chronicle system 100, at least one of the institutes 115 host the chronicle system 100 and/or provide portals to the chronicle system 100.

The institutes 115 use the integration framework 110 and the chronicle platform 105 to perform, for example, chronicle processing, access management, status monitoring, version generation, backing processing, data aggregation, and report generation. The institutes 115 are entities that fulfill a resource request. The institutes 115 use a resource memorandum in completed form to grant or deny the resource request. The resource memorandum describes, among other things, a qualification profile of a resource requestor.

The chronicle platform 105 builds and updates the resource memorandum while it is processing the resource request. For instance, in some cases the chronicle platform 105 generates the resource memorandum that indicates the resource requester is not qualified for the requested resource. In that case the institute 115 can deny the resource request or take alternative action. Initially the chronicle platform 105 assigns each resource request a resource request identifier and the resource memorandum is associated with the resource request by the resource request identifier. The chronicle platform 105 also initially assigns a version identifier to the resource memorandum in order to trace subsequent versions of the resource memorandum that the chronicle system 100 uses while it processes the resource request. While the chronicle platform 105 retains the same resource request identifier while processing the resource request, the resource memorandum will evolve through many versions during the same process and each time the chronicle platform captures the version of the resource memorandum, it will assign a new version identifier to the loan memorandum when it is captured. Accordingly, when the chronicle platform is processing the resource request it creates a traceable history of versions of the resource memorandum that the institutes 115 various agents can audit.

The network 185 connects each of the institutes 115 with the integration framework 110, the chronicle platform 105, and one or more data services 180. The network 185 can include, for example, the Internet, an intranet, a secure network, a virtual private network, a local area network, a wide area network, or a wireless network. A network is a system of computers and peripherals that are linked together and can consist of as few as two computing devices connected or millions of computers over a large geographical area with or without wires—such as the Internet or the cellular telephone network. The network 185, for example, uses encrypted communications to securely transmit data in some embodiments. The network 185 can connect each of one or more institutes 115 with the integration framework 110, the chronicle platform 105, and one or more data services 180 using standard or custom APIs in some embodiments or with any other method or protocol to communicate over a network.

The data services 180 send service data to the institutions 115 and/or the integration framework 110 on the network 185 through to the chronicle platform 105. The chronicle platform 105 uses the service data to, for example, process chronicles, capture resource memorandum versions, aggregate data, and generate reports that the institutes 115 use to grant or deny resource requests. In one instance, the chronicle platform 105 detects, for each chronicle, which content buckets associated with the chronicle have been filled with a corresponding content objects. The detection can include, for example, identifying particular content buckets based on a request type and checking a status of each of the particular content buckets in correspondence with resource request identifier.

The data services 180 include any number of third party services providing data to the chronicle system 100 including a pricing service, an extension service, a geography service, a tax service, an appraisal service, an identification service, a watchdog service, a background service, a benchmarking service, and a document service. The data services 180 send the service data to integration framework 110. The data services 180 retrieve data from a number of reporting services. For example, the pricing service retrieves data from sources including PrecisionLending™, and the extension service retrieves data from reporting services including CBC Innovis™ and Dunn and Bradstreet™. The geography service retrieves data from reporting services that include FEMA's Flood Map Services Center. The tax service retrieves tax data from reporting services, including, for example, city, county, state, and federal taxing authorities. And the appraisal service retrieves data from reporting services, including, for example, city, county and state appraisal agencies and Kelly Blue Book™. The identification service uses reports from services like Moody's™, Westlaw™, and LexisNexis™ are included in the reporting services that provide data to the watchdog service. One of the sources used by the background service is Equifax Business Connect™. The benchmarking service obtains reports from, for example Reuters™ RNA. The document service uses FIS FLO™ and LaserPro™ providers, among others. The integration framework 110 passes data from data services 180 to the chronicle platform 105 after it has transformed the data.

The integration framework 110 is also a tenant on the multitenant platform. The integration framework 110 receives data and requests in any variety of data formats from one or more sources including the institutes 115, the chronicle platform 105, and the data services 180. In some cases the institutes 115, the data services 180, and the chronicle platform 105 push data and/or requests to the integration framework 110. The integration framework 110 fulfills the request, transforms the data, and sends the data to the correct target. For example: the chronicle platform 105 sends a request for an extension report to the integration framework 110; the integrations framework 110 retrieves the report from the extension service 135; transforms it to a format compatible with the chronicle platform 105, and sends the result to the chronicle platform 105. The integration framework 110 receives data in real-time, in batches, or as updated data. The integration framework 110 uses servers and databases to transform the data from a source to a format compatible with the target it is intended for; and sends it to that target. For instance, when the chronicle platform 105 generates an updated resource memoranda for the institutes 115, it sends the updated resource memorandum to the integration framework 110, and then the integration framework 110 transforms the updated resource memorandum to a format expected by institutes 115, and sends it to institutes 115. The integration framework 110 receives and transforms data from other tenants on the multitenant platform concurrently in some cases or sequentially in others. The integration framework 110 is a first interface between both the institutes 115 and the data services 180 and the chronicle platform 105.

The chronicle platform 105 communicates with the institutes 115 and the integration platform 110 using the network 185. The chronicle platform 105 receives content objects from the institutes 115 and the integration framework 105. The chronicle platform 105 creates chronicles and populates the chronicles with the content objects (e.g., received from, or generated based on data received from, a user device, institute agent device, etc.). Each chronicle can pertain to one request, and the chronicle can include associated content objects and/or indications that one or more content objects of particular types have not been received. The chronicle can further include a status of each of one or more content object and/or the chronicle as a whole, which may relate to a level of completion and/or assessment.

The chronicle platform 105 processes the populated chronicles to update the resource memorandum and to generate reports and documents that the institutes 115 use to grant or deny the resource request. The chronicle platform 105 captures versions of the resource memorandum and creates a resource request processing history that the institutes 115 agents use for auditing purposes. The chronicle platform 105 generates the presentation and the resource memorandum for the institutions 115 in some cases in a web page format or as an API and in other cases in standard or custom document formats, such as Word™. The chronicle platform 105 also aggregates data from multiple tenants and generates corresponding reports for the institutes 115. The chronicle platform 105 also uses the aggregated data to process chronicles. The chronicle platform 105 serves institutes 115 concurrently in some cases or sequentially in other cases.

Figure 2A:
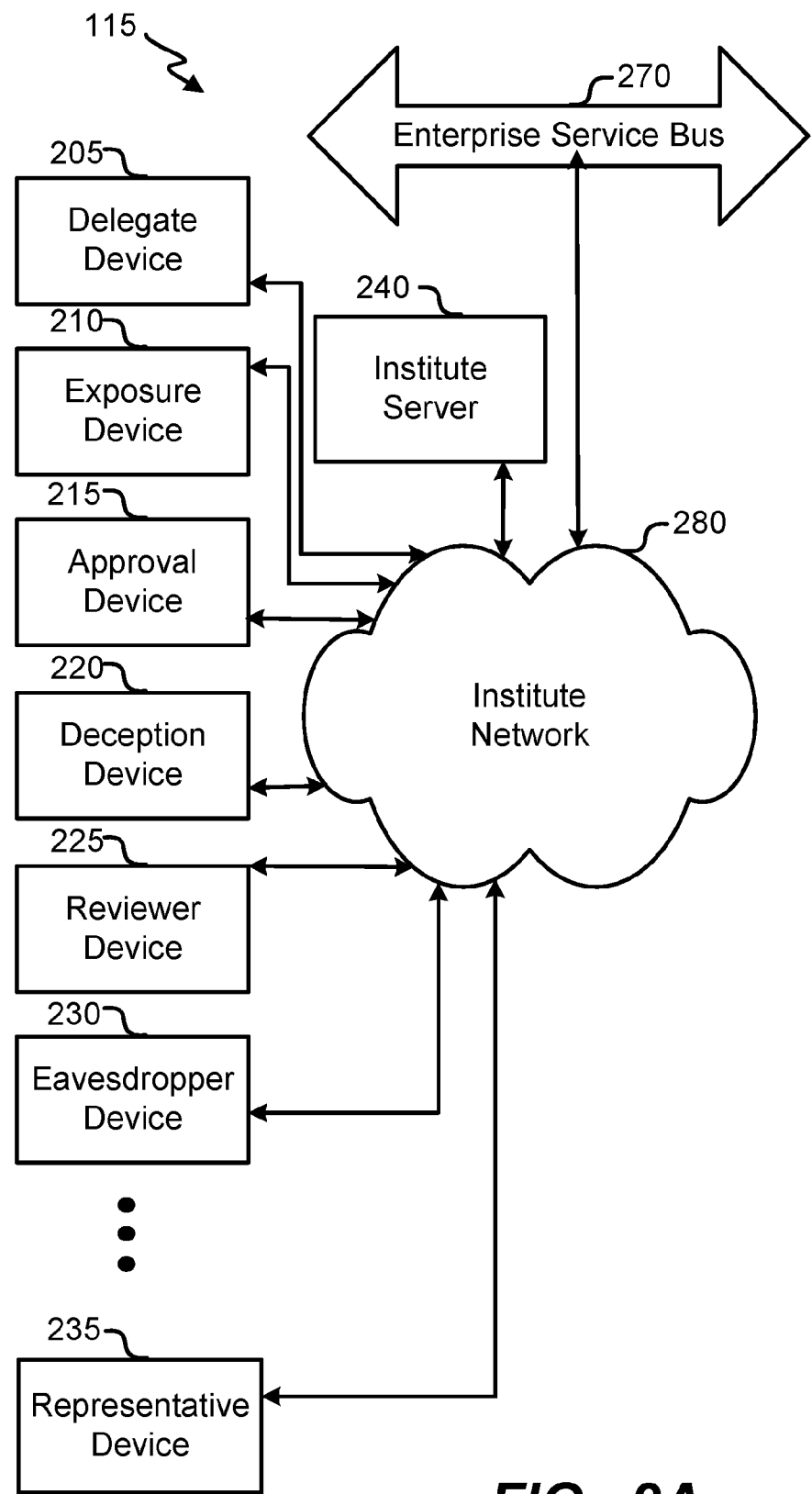
FIG. 2A depicts block diagrams of an institute.

FIG. 2A depicts a block diagram of an embodiment of an institute 115. The institute 115 are entities that grant or deny end-user resource requests such as for home mortgages. The institute 115 access the chronicle platform 105 to obtain, for example, chronicle processing, resource memorandum updating, version capture, backing processing, data aggregation, and report generation. The institute 115 internal agents include: a delegate agent using a delegate device 205;

an approval agent using approval device 215; a deception agent using a deception device 220; a reviewer agent using a reviewer device 225; an eavesdropper agent using an eavesdropper device 230; a exposure agents using a exposure device 210; and a representative using a representative device 235. Although this block diagram of an embodiment of institute 115 shows only the single delegate device 205, the single approval device 215, the single deception device 220, the single reviewer device 210, the single representative device 235, the single end-user device 250, the single watchdog device 255, and the single eavesdrop device 260, in other embodiments the institute 115 include multiple devices in each instance that correspond to multiple agents. The devices comprise all manner of computing apparatus such as general purpose computers, mainframe computers, terminals connected to servers, desktop computers, notebook computers, tablet computers, pad computers, and smart phones. The institute 115 internal and third-party agents use devices that are connected by an institute network 280 to an institute server 240. The institute server 240 may also be connected to an enterprise service bus 270 and the data services 180 by the institute network 280.

The delegate agent is the loan officer in some cases and communicates with the end-user agent that initiated the resource request directly in some cases, for example, in-person or by telephone. The delegate agent requests data and documents from the end-user agent that are necessary to determine whether the end-user is qualified for the resource request. Alternatively the delegate device 205 communicates with the end-user device 250 over the institute network 280 via email, text, facsimile, or any other method of electronic communication. In most cases the chronicle platform 105 will trigger a version capture event when the delegate device 205 collects data from the end-user device 250. The delegate device 205 collects end-user agent data relevant to qualifying the end-user agent for the resource request and sends it to the enterprise service bus 270 or the institute server 240. The delegate device 205 makes requests for and accesses reports and documents that the chronicle platform 105 generates such as the resource memorandum. The delegate device 205 communicates over the institute network 280 with other internal devices including the exposure devices 210, the approval device 215, the deception device 220, the reviewer device 225, the eavesdropper device 230 and the representative device 235 over the institute network 280.

The exposure agent 210 evaluates risk associated with the institutes' 115 granting or denying a resource request. The exposure device 210 makes requests for and accesses reports and documents including the resource memorandum that the chronicle platform 105 generates. The exposure device 210 also requests additional data from the end-user device 250 in some cases when the chronicle platform 105 generates a report that indicates the end-user agent is associated with a high exposure that might be mitigated by additional end-user agent data. The exposure device 210 communicates with other internal devices such as the delegate device 205, the approval device 215, and the eavesdropper device 230 over the institute network 280. The approval agent approves the institutes 115 decision to grant or deny the end-user agent's resource request. The approval device 215 makes requests for and accesses reports and documents that the chronicle platform 105 generates, such as updated resource memorandum. The approval device 215 communicates with the reviewer device 225 over the institute network 280. The reviewer agent reviews institutes 115 decisions granting or denying end-user agent requests using the reviewer device 215 to access reports such as the resource memorandum that the chronicle platform 105 generates. The reviewer device 215 communicates with other internal devices such as the eavesdropper device 230 over the institute network 280.

The eavesdropper agent audits transactions related to resource requests. The eavesdropper device 230 makes requests for and accesses reports and documents including the resource memorandum that the chronicle platform 205 generates. For instance, the eavesdropper device 230 audits the resource memorandum capture history associated with the resource request. The eavesdropper device in some cases communicates with the watchdog device 255 and the eavesdrop device 260 over the institute network 280. The eavesdropper device 230 communicates with all other internal devices over the institute network 280, including the deception device 220. The deception agent monitors transactions related to resource requests for fraudulent activity including an end-user inaccurately reporting revenue. The deception device 220 also makes requests for and accesses reports and documents, including the resource memorandum generated by the chronicle platform 105. The deception device 220 in some cases communicates with the watchdog device 255 and the eavesdrop device 260 over the institute network 280. The deception device 220 communicates with all other internal devices such as the representative device 235 over the institute network 280. The representative agent 235 works in the institutes 115 front offices to conduct in-person end-user transactions. The representative device 235 can access reports and documents including resource memorandum generated by the chronicle platform 105 over the institute network 280.

The institute network 280 connects the internal devices, the third-party devices, the institute server 240, the data services 180 and the enterprise service bus 270. The institute network 280 can include, for example, the Internet, an intranet, a secure network, a virtual private network, a local area network, a wide area network, or a wireless network. The institute network 280, for example, in some embodiment uses encrypted communications to securely transmit data. The institute network 280 also connects using standard or custom APIs (an "application program interface" is a set of routines, protocols, and tools for building software applications that specify how software backings should interact) in some embodiments. In most embodiments the institute network 280 will include a firewall to protect the institutes 115 from security access breaches. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied.

The institute server 240 is a computing device connected to all internal and third-party devices, the data services 180, and the enterprise service bus 270 by the institute network 280. A server is an instance of a computer program that accepts and responds to requests made by another program typically called a client. Any device that runs server software can generally be considered a server. Servers are also typically used to manage and control a network's resources. Servers may be set up to control access to a network, send/receive e-mail, manage print jobs, or host a website. Some servers are committed to specific task; and then are referred to as dedicated. Servers are commonly used to deliver services that are required constantly, most servers are never turned off. The institute server 240 manages, stores, sends, receives, and processes data for the institutes 115. For example, the institute server 240 can provide institutes 115 with around-the-clock file and network security, centralized data storage and shared resources, virus management and centralized back up processes. In addition, the institute 240 server can control access to the institute network 280 and other internal process and manages all user credentials. The institute server 240 also can provide the authentication interface to mobile and third-party devices using the Internet or other external network from outside of the institute network 280 firewall. Additionally, the institute server 240 can provide increased reliability so that there are no interruptions in the institute 115 workflow processes such as the resource request process The institute server 240 maintains a local database and performs all internal processes for the institute 115. The institute server 240 also controls all requests to the chronicle platform 105 and access to the integration framework 110 made by all internal and third-party devices through the enterprise service bus 270. For instance, the institute sever 240 directs the enterprise service bus 270 to send updated account data to the chronicle platform each day at a particular time. The institute server 240 also provides file security for the institute 115 by designating an authorization for each file such that only authorized agents can gain access to that file. For instance, the institute server 240 will not allow an eavesdrop agent access to the institute 115 employee personal information. The institute server 240 also provides the institute 115 with critical virus protection services to protect the institute 115 from a virus that a third-party device might introduce. The institute server 240 also provides the authentication interface to mobile devices using the Internet, or any other network, outside of the institute network 280 firewall.

Some institutes may further comprise an enterprise service bus 270. An enterprise service bus, or ESB, is fundamentally an architecture. It is a set of rules and principles for integrating numerous applications together over a bus type infrastructure. The enterprise service bus 270 is a second interface between both the institutes 115 and the data services 180 and the chronicle platform 105. The enterprise service bus 270 receives data in any variety of data formats from one or more sources including the data services 180. In some cases data services 180 push data to the enterprise service bus 270. Conversely, in other cases the enterprise service bus 270 pulls data from the data services 180. The enterprise service bus 270 receives data in real-time, in batches, or as updated data. The enterprise service bus 270 sends data to the chronicle platform in a predefined format acceptable by a data interface 365 and a user interface 320. The enterprise service bus 270 uses servers and databases to transform the data into other formats compatible with the chronicle platform 105. The enterprise service bus 270 sends the transformed date to the chronicle platform 105. The enterprise service bus 270 also transforms the date from the chronicle platform into the proper format for institutes 115. The enterprise service bus 270 also transforms data transmitted and received to and from the data services 180 into compatible formats as required. The enterprise service bus 270 distributes information across the institutes 115 quickly and easily, masks the hardware and networking differences among the devices using institutes 115, and integrates legacy processes and data to current workflows.

Figure 2B:
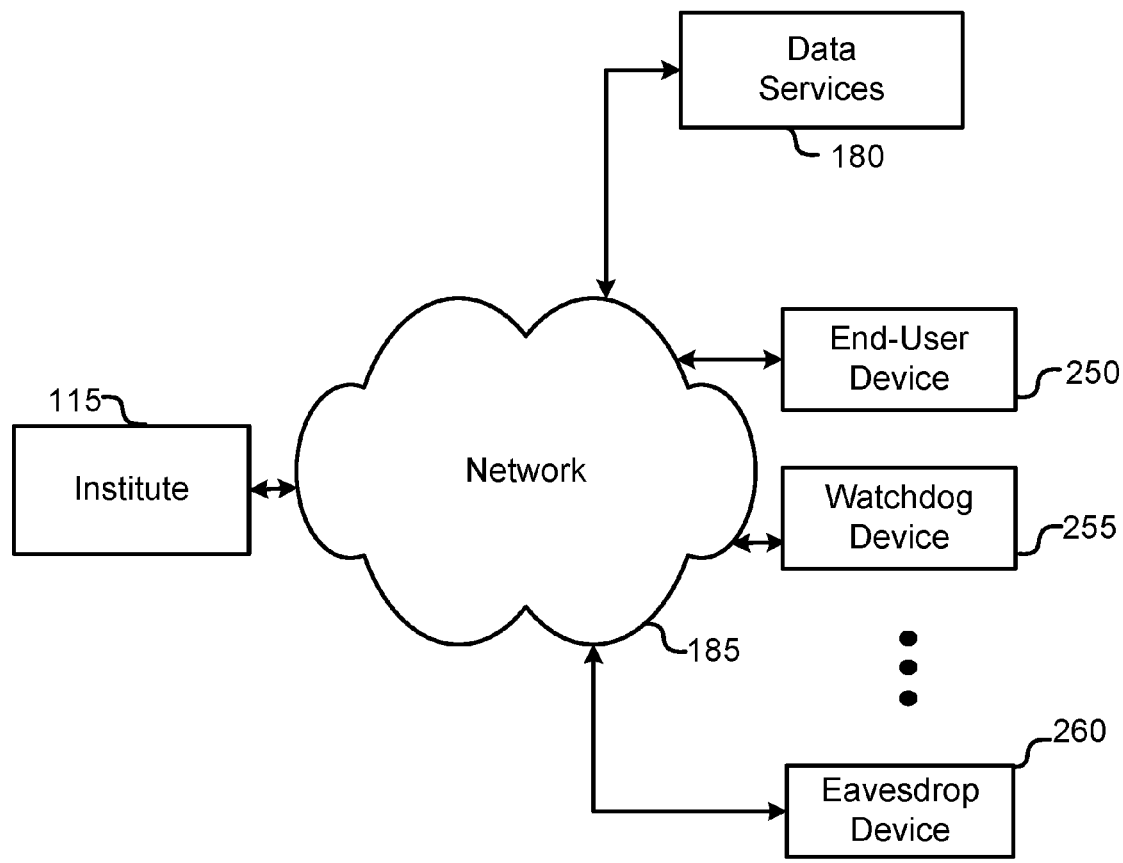
FIGS. 2B and 2C depict block diagrams of institutes communicating with other devices.

FIG. 2B depicts the institutes 115 (e.g., that includes an enterprise service bus, such as the enterprise service bus 270) in communication with data services 180, end user device 250, watchdog device 255 and eavesdrop device 260 over the network 185. An end-user agent is the resource requester. The end-user agent can be, for example, an individual or company requesting a home, personal, business or equipment loan or a treasury service. The end-user agent communicates directly with the delegate agent, for instance in person or by telephone. The end-user agent electronically communicates with institutes 115 using the end-user device 250 and sends content objects related to the resource request to delegate device 205 or the institute server 240. The end-user device 250 accesses reports and documents that the chronicle platform 105 generates over the network 185. The watchdog agent monitors transactions related to resource requests for regulatory violations. The watchdog device 255 accesses reports and documents generated by the chronicle platform 105 over the network 185. The eavesdrop agent eavesdrops transactions related to resource requests including the resource memorandum capture history. The eavesdrop device 260 accesses reports and documents including the resource memorandum generated by the chronicle platform 105.

Figure 2C:
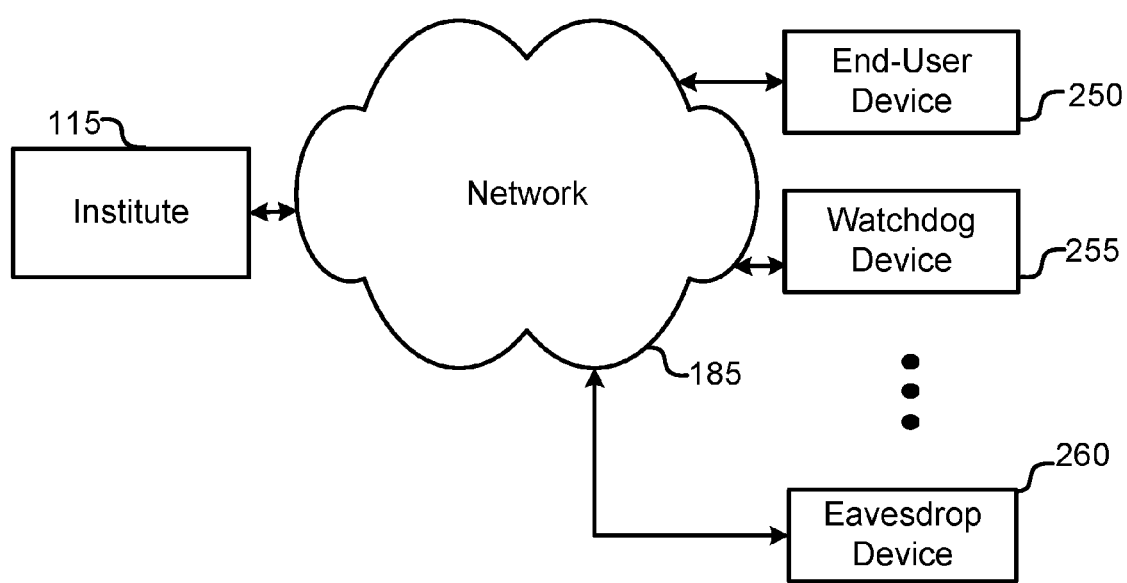

FIG. 2C depicts the institutes 115 (that need not include an enterprise service bus) that is not in direct communication with data services 180, as is shown in FIG. 2B, in communication with end user device 250, watchdog device 255 and eavesdrop device 260 over the network 185. In this embodiment, the integration framework 110 performs the data format transformations for institute 115 as well as interfaces with data services 180 for institutes 115.

Figure 3:
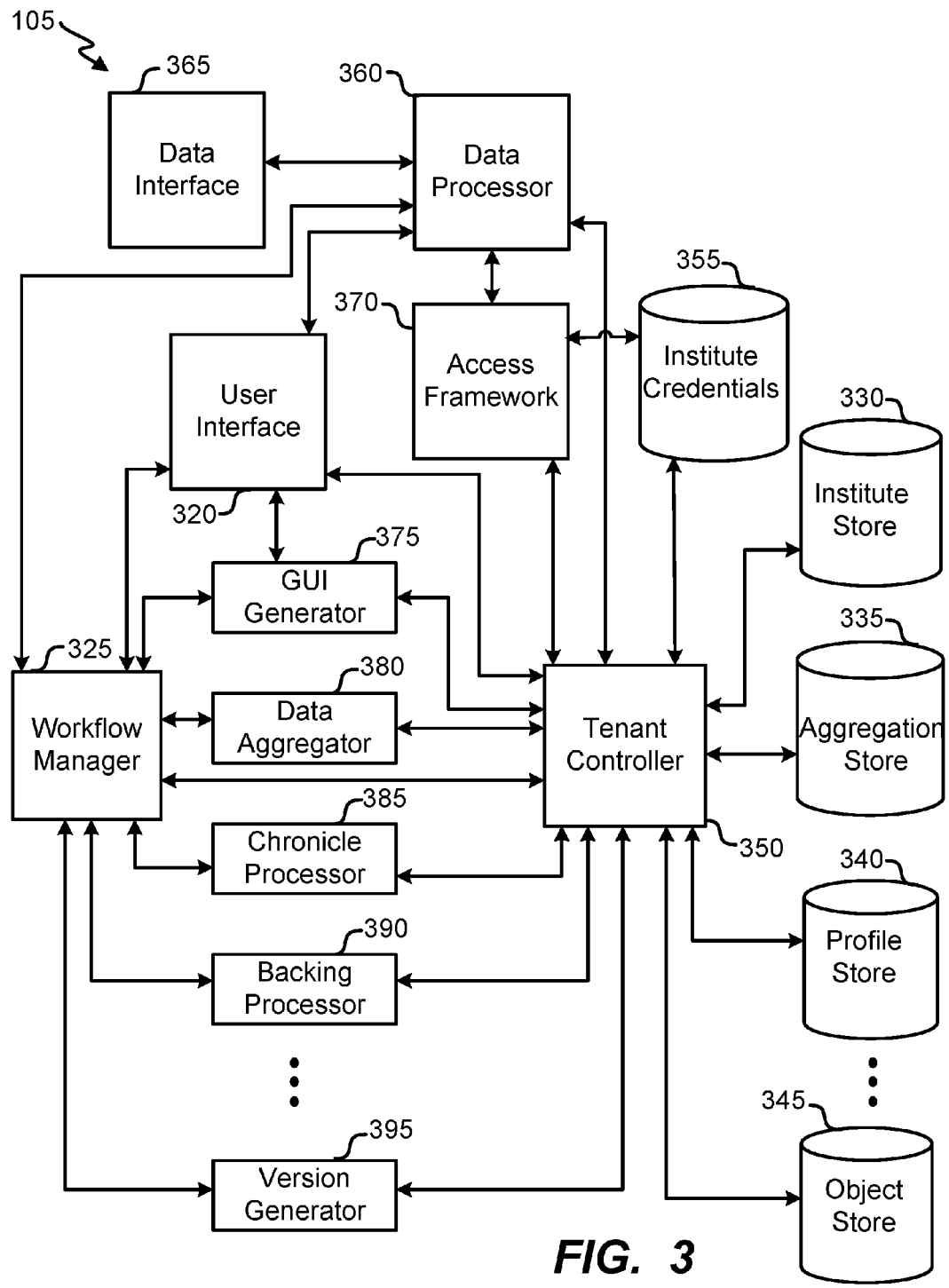
FIG. 3 depicts a block diagram of an embodiment of a chronicle platform.

FIG. 3 depicts the block diagram of an embodiment of the chronicle platform 105. The chronicle platform 105 is a tenant on the multitenant platform that the chronicle system 100 is built on. The chronicle platform 105 is the tenant that provides chronicle system 100 services to other tenants on the platform, specifically the institutes 115 tenants. The chronicle platform 105 communicates directly with the integration framework 110 and the institutes 115 through the data interface 365 and the user interface 320 over the network 185. The data interface 365 communicates using TCP/IP (transmission control protocol/internet protocol) with the integration framework 205 over the network 185. The data interface 365 uses HTTP(s) requests and responses. The data interface 365 transmits and receives data in JSON and XML formats embedded in the HTTP(s) requests and responses. For example, the data interface 365 uses the Salesforce™ Bulk API and makes an HTTP(S) request for large data files from institutes 115 and then receives them with the data embedded in JSON or XML formats in an HTTP(s) response from the integration framework 110. In another example the data interface 365 sends HTTP(s) requests to document service 175 with resource request data embedded in XML format. The data interface 365 also uses HTTP(S) web service calls to request and receive data. For example, the data interface 365 sends HTTP(s) web service requests to retrieve data from pricing service 130, identification service 155, and extension service 135.

The user interface 320 receives and transmits requests and responses between the institute 115 devices and the chronicle platform 105 over the network 185 using the enterprise service bus 270 or the integration framework 110. The user interface 320 uses HTTP(s) web service connections in addition to JSON and XML formats embedded in the HTTP(s) requests and responses to communicate and send and receive data between the chronicle platform 105 over the network 185 and to the institute 115 devices by way of the integration platform 110 or the enterprise service bus 270. The user interface 320 transmits presentation data generated by the GUI generator 375 to the institute 115 devices using HTTP(s) web services. While described separately here, both the user interface 320 and the data interface 365 can be combined as a single interface or can be hosted on a single processor. In other embodiments the user interface 320 and the data interface 365 also use any form of network communication protocols not described here.

A data processor 360 filters the credential and permission information from incoming HTTP(s) requests and responses from data interface 365 and user interface 320 and sends them to an access framework 370 to determine if the requests and responses are from a verified source. The data processor 360 stops processing the HTTP(s) request or response if the access framework 370 does not verify the source. The data processor 360 extracts the embedded data from the response. The data processor 360 then sends the extracted data to a tenant controller 350 and transmits the filtered response to a workflow manager 325. For instance, when the chronicle platform 105 makes an HTTP(s) request for an extension report from the integration framework 110: the integration framework 110 returns an HTTP(s) response with the extension data requested embedded in the HTTP(s) response; the data processor 360 filters the HTTP(s) response and sends the credential and permission information to the access manager 370; the access manager verifies the source; the data processor 360 then extracts the extension data and sends it to the tenant controller 350; and the data processor 360 sends the filtered response to the workflow manager 325. When the workflow manager 325 is ready to send an HTTP(s) request or a response, it transmits instructions to the data processor 360. The data processor 360 interprets the instructions from the workflow manager 325, retrieves data from the tenant controller 350 if so instructed, compiles the HTTP(s) request or response, and transmits the compiled HTTP(s) request or response to the data interface 365. For instance, when the workflow manager 325 determines that a loan memorandum is ready to be transmitted to institutes 115: workflow manager 325 sends instructions to the data processor 360 to retrieve the resource memorandum data from the tenant controller 350 along with general delivery instructions; the data processor 360 retrieves the resource memorandum data from the tenant controller 350 and complies the HTTP(s) response; and the data processor 360 transmits the compiled HTTP(s) response to the data interface 365. At the same time the workflow manager 325 sends instructions to the GUI generator 375 to create a presentation for the institutes 115 devices and instructs the data processor 360 to transmit that presentation to the user interface 320.

The workflow manager 325 manages the processes and interactions in the chronicle platform 105. The workflow manager 325 receives filtered requests and responses from the data processor 360 and parses and interprets them to determine which of the GUI generator 375, the data aggregator 380, the chronicle processor 385, the backing processor 390, and the version generator 395 processes to initiate and control in response to the requests and responses. The workflow manager 325 also receives triggers from the chronicle platform 105 itself that indicate an event has occurred that requires further processing. The workflow manager 325 then initiates the processes, manages the processes to the end, and controls and coordinates interactions among processes. For instance, when the institutes 115 request or a triggering event to capture the current version of the resource memorandum occurs, the workflow manager 325: instructs the tenant controller 350 to retrieve the correct data and send it to a version generator 395; starts the version generator 395; waits for the version generator 395 to capture the version; instructs the version generator 395 to send the result to the tenant controller 350; instructs the tenant controller 350 to retrieve data and send it to the chronicle processor 385; starts the chronicle processer 385; waits for the chronicle processor 385 to finish; instructs the chronicle processor to send the result to the tenant controller 350; instructs the tenant controller 350 to retrieve data and send it to a GUI processor 375; instructs the GUI processor to generate a browser viewable form of the captured resource memorandum; waits for the GUI processor 375 to finish; instructs the GUI processor 375 to send the result to the tenant controller 350; instructs the tenant controller 350 to retrieve data and send it to the data processor 360; and then instructs the data processor 360 to generate an HTTP(s) response that contains a presentation of the event that triggered the version generator 395 to capture the current versions of the resource memorandum. The workflow manager 325 identifies the workflow progression for any process on the chronicle platform 105. The workflow manager 325 initiates each of the GUI generator 375, the data aggregator 380, the chronicle processor 385, the backing processor 390, and the version generator 395 simultaneously or successively or both. For instance, the workflow manager 325 can initiate the version generator 395 to capture a version of the resource memorandum while concurrently initiating the GUI generator 375 to create a presentation to report on the event that triggered capturing the version of the resource memorandum. Conversely, if the workflow to respond to the event that triggered capturing the version of the resource memorandum also required that the chronicle platform 105 return a copy of the version of the resource request, in that case the workflow manager 325 would initiate the version generator 395 and the GUI generator 375 successively. A graphical user interface known here as a GUI, is a type of interface that allows users to interact with electronic devices through graphical icons and visual indicators such as secondary notation, as opposed to text-based interfaces, typed command labels or text navigation.

The access framework 370 controls access to the chronicle platform 105. The access framework 370 receives credentials and permissions from incoming HTTP(s) requests and responses; retrieves credentials and permissions from an institute credentials 355; and verifies that the credentials and permissions match or validates them in any number of ways. The access framework 370 also retrieves credentials permissions from the institute credentials 355 and sends them to the tenant controller 350 for the data processor 360 to embed them into the HTTP(s) requests and responses that the data interface 365 sends to the integration framework 110 or the institutes 115. The Hypertext Transfer Protocol (HTTP) is an application protocol for distributed, collaborative, hypermedia information systems. It is the foundation of data communication for the World Wide Web. Hypertext is structured text that uses logical links (hyperlinks) between nodes containing text.

The access framework 370 manages permissions based on inputs. For example, a user having requested a resource can specify permissions pertaining to the request. The permissions can indicate that one or more other users or agents are permitted to access select or all data pertaining to the request. Permissions may, but need not, be time-limited, which may include limiting access permission to (for example) a particular period of absolute time (e.g., date range) or a period of time with a beginning or end defined by a given event (e.g., detection of a content object or progression to a new state in a workflow). As one illustration, a requestor device may identify one or more agents via corresponding email addresses to indicate that each of the one or more agent is permitted to access data being collected and submitted for the request. Should any of these identifiers subsequently be received from a device as a form of identification, the access framework 370 may determine that data pertaining to the request (e.g., previously collected data, analysis of previously collected data and/or specifications of data that still is to be collected) can be transmitted to the device.

Permissions may, but need not, be tied to task delegation. In one instance, delegating a task pertaining to a request to a given agent has an effect of also granting access permission (e.g., to task-specific data and/or request-specific data) to the agent. The access permission may include (for example) a read-access and/or an access that permits uploading, data entry, and/or data editing. A task that is delegated may include, e.g., providing a particular type of content object or a particular type of data (e.g., corresponding to a given field).

The tenant controller 350 retrieves and stores data used by all of the processes on the chronicle platform 105. The tenant controller 350 is connected to all storage media and all processors on the chronicle platform. The workflow manager 325 instructs the tenant controller 350 when to retrieve data and where to send it. For instance, when the workflow manager 325 is ready to initiate the chronicle processor 385 to complete a workflow, it instructs the tenant controller 350 to retrieve all of the data required to process the workflow and to send it to the chronicle processor 385. The workflow manager 325 instructs the chronicle processor 385 to send the result to the tenant controller 350 when it has completed processing.

The institute credentials 355 stores institutes 115 credentials and permissions. An institute store 330 stores data specific to each of the institutes 115 and its end-users. The data may include, for example, agent-identifying information (e.g., email addresses), credentials of one or more agents, and/or associations between each of one or more agents and one or more requests.

An aggregator store 335 stores results from a data aggregator 380. A profile store 340 and an object store 345 store data local to the chronicle platform 105. Although depicted as separate storage in FIG. 3, the institute credentials 355, the institute store 330, the aggregator store 335, the profile store 340 and object store 345 are implemented in one or more storage devices in other embodiments.

The GUI generator 375 generates the graphical user interface presentations that the chronicle platform 105 sends through the integration framework 110 or the enterprise service bus 270 to the agent that sent an HTTP(s) request or response to the chronicle platform 105. The workflow manager 325 starts the GUI generator 375 after instructing the tenant controller 350 to retrieve and send data to the GUI generator 375. The institutes 115 may each have any number of graphical user interface format requirements. For instance the GUI generator 375 will generate different graphical user interfaces for a tablet than for a smart phone and yet another for a laptop computer. The workflow manager 325 passes the GUI generator 375 the necessary format instruction in some circumstances and in other circumstances the tenant controller 350 sends the format instruction.

The data aggregator 380 aggregates data from any number of sources that is relevant to processing the resource request. In one example the data aggregator 380 collects data (e.g., pertaining to multiple requests) from many tenants on the multitenant platform. The data aggregator 380 then strips all confidential and personal information from the data it receives from the many tenants so that all tenants can access the aggregated data. The data aggregator 380 groups like data and performs any number of statistical analyses on that data. For example, the data aggregator 380 computes the average annual income of every end-user resource requester for all tenants. The data aggregator 380 also aggregates entities and actions related to the resource request. For instance, the data aggregator 380 can aggregate all family members that own a property they are trying to mortgage. The data aggregator 380 can aggregate their annual income, their indebtedness, and other factors critical for the institutes 115 to qualify the resource request. The chronicle processor 390 uses the data aggregator 380 result to process chronicles and update the resource memorandum, in some cases.

The chronicle processor 390 manages interactions and information associated with the resource request. The chronicle processor 390 creates a chronicle for each resource request and populates the chronicle with content objects related to the resource request. The chronicle processor 390 manages all of the documents related to the resource request. The chronicle processor 390 tracks a status of document provision, such that—for a particular request—it can be determined (for example) which content objects have been received, completed, reviewed and/or finalized and/or which content objects still may be or must be received, completed, reviewed and/or finalized for full processing of the request. The chronicle processor 390 processes the content objects in the chronicle to generate and update the resource memorandum and other reports related to the resource request. For example, the chronicle processor 390 computes the spread of the interest rate used to fulfill a resource request. The chronicle processor 390 uses the content objects from the data services 180 to populate the chronicle with data used to qualify the resource request—for example—a resource request for a home loan, business loan, or vehicle loan.

The chronicle processor 390 creates a trigger that the workflow manager 325 detects and processes when predetermined events occur. For instance, when the chronicle processor 390 fills a chronicle with all of the content objects required to establish the qualification profile of the resource requester, the chronicle processor 390 creates the trigger that workflow manager 325 detects and then, once detected, initiates the workflow for capturing a version of the resource memorandum. As another example, the chronicle processor 390 creates a trigger that a delegated task has not been completed by a particular time. An alert may then be generated (e.g., to be presented via the GUI generator 375) or the task may automatically be re-delegated.

The workflow manger 325 also initiates the GUI generator 375 to generate a presentation for the institutes 115 agent to signify that the documents required to qualify the resource request are complete, and as such, the resource requester's qualification profile is ready for the institutes 115 agent to evaluate. The chronicle processor 390 is workflow driven by the workflow manager 325 that instructs the chronicle processor 390 how to progress through processing a chronicle based on any number of events occurring externally to the chronicle platform 105 as well as events occurring in the chronicle platform 105.

The resource memorandum is updated numerous times while chronicle system 100 is processing the resource request. For instance it is updated when extension service 135 sends a credit report or when the end-user device 250 uploads a paycheck stub or tax return. The version generator 395 captures versions of the resource memorandum at different points during the resource request processing that the eavesdropper device 230, the watchdog device 255, and the eavesdrop device 260 can audit. In some circumstances, the version generator 395 captures the version of the resource memorandum at the request of the institutes 115. As one example, a delegate device 205 makes a request to the chronicle platform 105 to capture the version of the resource memorandum before sending the resource memorandum to the reviewer device 225 for review. The version generator 395 also automatically captures the version of the resource memorandum based on triggering criteria generated by the workflow internal to the chronicle platform 105, and on such other triggers as the passage of time. For example, the workflow manager 325 detects the trigger sent by the chronicle processor 390 when it received the data from the credit report in the example above and initiates the version generator 395 to capture the version of the resource memorandum. The workflow manager 325 also instructs the version generator 395, to capture the version of the resource memorandum every 90 days. Once the version is captured the version generator 395 also creates a new version of the resource memorandum as dictated by instructions from the workflow manager 325, in some cases, and the new version of the resource memorandum becomes the active resource memorandum used by all parties to continue processing the resource request. According to the workflow instructions generated by the workflow manager 325, the version generator 395 forwards a copy of the captured version of the resource request for further processing, for instance, to the reviewer device 225. And if the instructions from the workflow manager so indicate, the version generator 395 forwards the new version of the resource memorandum to designated devices, such as the delegate device 205. After the version generator 395 captures the version of the resource memorandum it prevents further modification to the captured version in any number of ways. In some cases, the version generator 395 converts an editable document to one that is read-only—for instance the version generator 395 converts a Word document to a PDF document. The version generator 395 can also prevent further modification by write-protect protecting the captured version of the resource memorandum using any number of secure file storage processes and/or protocols either as s PDF file or any other, for instance, JSON or XML data corresponding to fields in the resource memorandum. In the case where the eavesdropper device 230 makes a request to audit the resource memorandum capture history, the chronicle platform 105 retrieves the resource memorandum capture history so that the eavesdropper device 230 can review it.

The backing processor 390 processes collateral related to the resource request. The backing processor 390 calculates for each piece of collateral such values as, for example, percent ownership, percent and length of indebtedness, relative relationship to the resource requester, and annual revenue or losses it generates.

Figure 4:
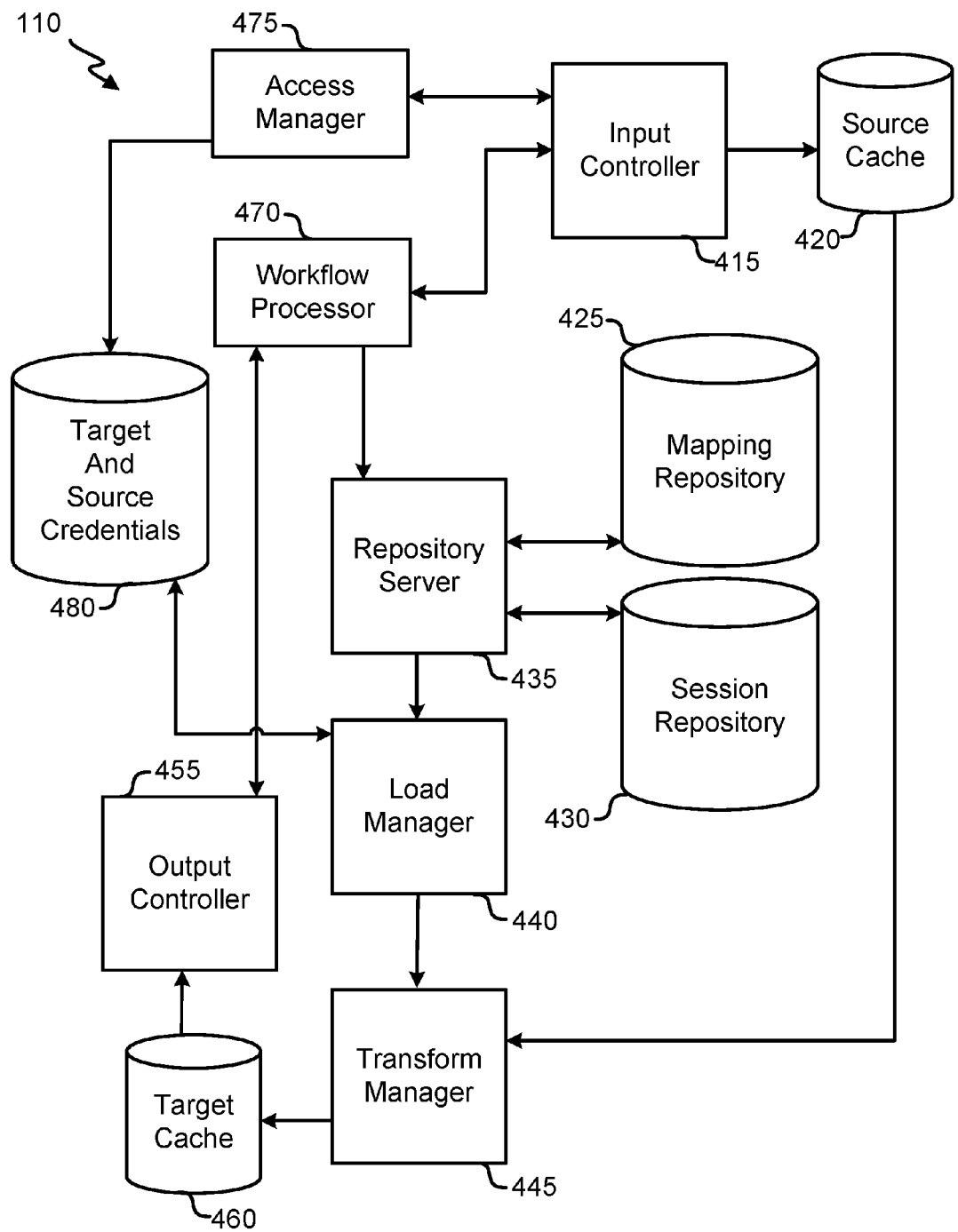
FIG. 4 depicts a block diagram of an embodiment of an integration framework.

FIG. 4 depicts the block diagram of an embodiment of the integration framework 110. The integration framework 110 is also a tenant on the multitenant platform the chronicle system 100 is built on. The integration framework 110 provides services to the chronicle platform 105 tenant and the institutes 115 tenants. The integration framework 110 is the first interface between both the data services 180 and the institutes 115 and the chronicle platform 105. The integration framework 110 therefore receives and sends HTTP(s) requests and responses to the institutes 115, the data services 180, and the chronicle platform 105. The integration platform 110 transforms embedded data in HTTP(s) requests and responses from a source data format of the requester or responder into a target data format for the intended recipient.

An access manager 475 controls input access to the integration platform 110. The access manager uses any known source of access authorization to align credentials of the input data to a target and source credentials 480. For instance, the access manager compares the input data credential to the corresponding credential in the target and source credential 480 and allows processing to continue if they match. In other cases, an encryption code from the target and source credentials 480 is used with the input data encryption key to decrypt the input data.

The input controller 415 receives and filters HTTP(s) requests and responses from the institutes 115, the data services 280, and the chronicle platform 105. The input controller 415 stores the data from the HTTP(s) requests and responses in a source cache 420 and waits until all data to be transformed is received and stored in source cache 420. The input controller 415 then sends the filtered response to a workflow processor 470 once all data is cached and ready to be transformed. For instance, when the extension service 135 sends an HTTP(s) response containing embedded extension data, the input controller 415 filters the HTTP(s) response to strip the embedded extension data, stores the data, checks to makes sure the data is complete, and sends the filtered response to workflow processor 470.

The workflow processor 470 manages all processes and interactions in the integration framework 110. The workflow processor 470 receives filtered requests and responses from the input controller 415. The workflow processor 470 calculates the mapping index and the session index necessary to transform the source data format to the target data format. The workflow processor 470 starts the process of transforming source data formats to target data formats by instructing a repository server 435 to retrieve mapping and session data relating the source data format to the target data format. The repository server 435 retrieves the mapping and session data and passes it to a load manager 440. The mapping maps the source data format to the target data format. The session is a set of instructions that describe how and when to transform the source data format to the target data format.

The load manager 440 validates the source and target by accessing the target and source credential 480 and only continues the process of transforming the data if there is proper validation. The load manager 440 triggers a transform manager 445 to transform the source data format to the target data format using the mapping and the session. For instance, when a source sends data in CSV format and the target requires the data in a text file, the session instructs the transform manager 445 how and when to convert from CVS to text and the transform manager 445 uses the mapping to map CVS fields to text fields. The transform manager 445 sends transformed data to a target cache 460 until all data is transformed. Once the target cache 460 contains all of the transformed data, an output controller 455 embeds the transformed data into an HTTP(s) response or request. In some cases, for example, the output controller 455 embeds the data using JSON or XML. The output controller 455 sends the HTTP(s) response to the target.

Figure 5:
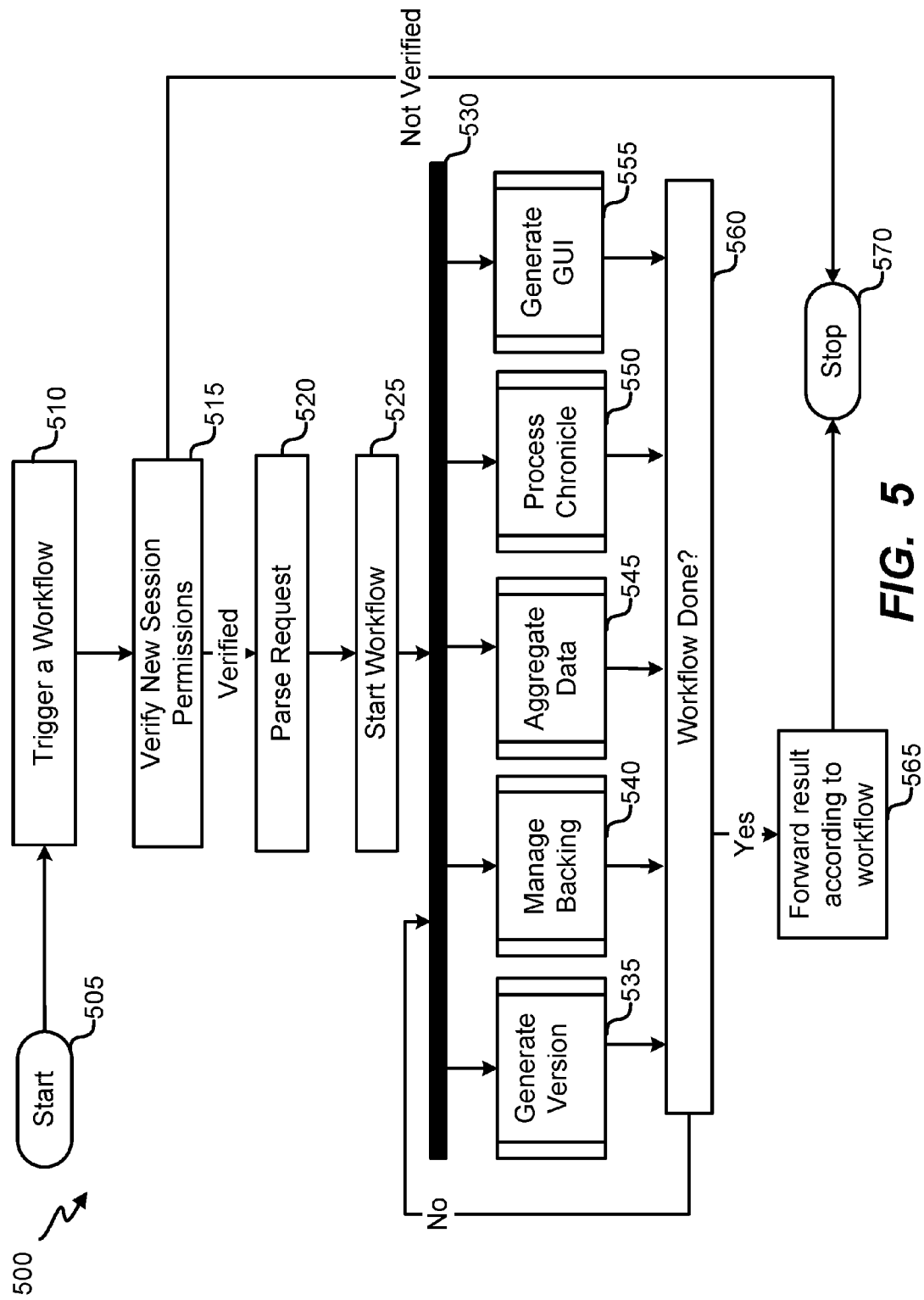
FIG. 5 illustrates a flowchart of an embodiment of a process for processing a resource request.

FIG. 5 illustrates a flowchart of an embodiment of a process 500 for processing the resource request in the chronicle platform 105. The process starts at block 505 when an event triggers a first workflow as shown in block 510. Any number of events occurring internal to the chronicle platform 105 and external to the chronicle platform 105 can trigger the first workflow in any number of ways. Each of the GUI generator 375, the data aggregator 380, the chronicle processor 385, the backing processor 390, and the version generator 395 will, in some cases, trigger a second workflow while in the midst of processing the first workflow. For instance, the chronicle processor 385 can trigger the second workflow when it calculates and/or detects a predetermined condition such as receiving data from data services 180, and the data aggregator 380 can trigger a third workflow when it calculates and/or detects a value that falls into a predetermined range, such as when the aggregate value of an end-user's annual returns are below a specified level. And, for instance, when the institutes 115 make any request related to processing the resource request they trigger a fourth workflow. The access framework 370, in some (but not other) instances, must verify credentials and permissions for the first workflow as shown in block 515. The access framework 370 can use any number of methods to verify credentials and permission including comparing credentials to those stored in institute credentials 355. If the access framework 370 cannot verify the credentials and permissions, the first workflow stops as shown in block 570. The data processor 360 filters the external HTTP(s) requests and responses for the first workflow request before the workflow manager 325 parses the request as shown in block 520.

The GUI generator 375, the data aggregator 380, the chronicle processor 385, the backing processor 390, and the version generator 395 are all connected to a synchronization bar 530. The workflow manager 325 synchronizes the GUI generator 375, the data aggregator 380, the chronicle processor 385, the backing processor 390, and the version generator 395 as shown in the synchronization bar 530. The workflow manager 325 calculates which of the GUI generator 375, the data aggregator 380, the chronicle processor 385, the backing processor 390, and the version generator 395 processes can run simultaneously and which must wait for the output of another processes. The workflow manager 325 initiates each process accordingly. For example, at block 545, the data aggregator 380 can aggregate data for a given request that may include content objects, data composite values and/or processing results pertaining to a single request or to multiple requests. The chronicle processor 385 can organize the data to generate or update a chronicle corresponding to the request. At block 550, the chronicle processor 385 can process the data from a chronicle to identify missing content objects and/or data (e.g., composite values and/or processing results), whether one or more values satisfy a given condition (e.g., exceed one or more thresholds in one or more defined directions), a status of one or more content objects or resource memorandum, and so on. At block 555, the GUI generator 375 can generate one or more GUIs based on the processing (e.g., to identify missing content objects or data, present an alert of missing data, present a processing alert and/or convey a status).

As shown in the workflow done block 560, when each process is finished the workflow manager 325 computes whether the GUI generator 375, the data aggregator 380, the chronicle processor 385, the backing processor 390, and the version generator 395 processes are complete or if there are processes that still need to be initiated. The workflow manager 325 continues to check if everything is complete at block 560 until all processes in the first workflow are complete. Any number of iterations of starting a new process can happen in block 560 since any of the GUI generator 375, the data aggregator 380, the chronicle processor 385, the backing processor 390, and the version generator 395 processes can trigger a successive workflow. Once there are no more processes to initiate, the workflow manager 325 computes the destination of where it should route the result of the first workflow and forwards it there as shown in box 565.

The workflow stops as shown in block 570. Once the first workflow is triggered as shown in block 510, the process 500 for processing a resource request can start again at block 505 if a second workflow or successive workflow is triggered even if the first workflow has not reached block 570 since the workflow manager 325 controls the synchronization as shown in synchronization bar 530.

Figure 6:
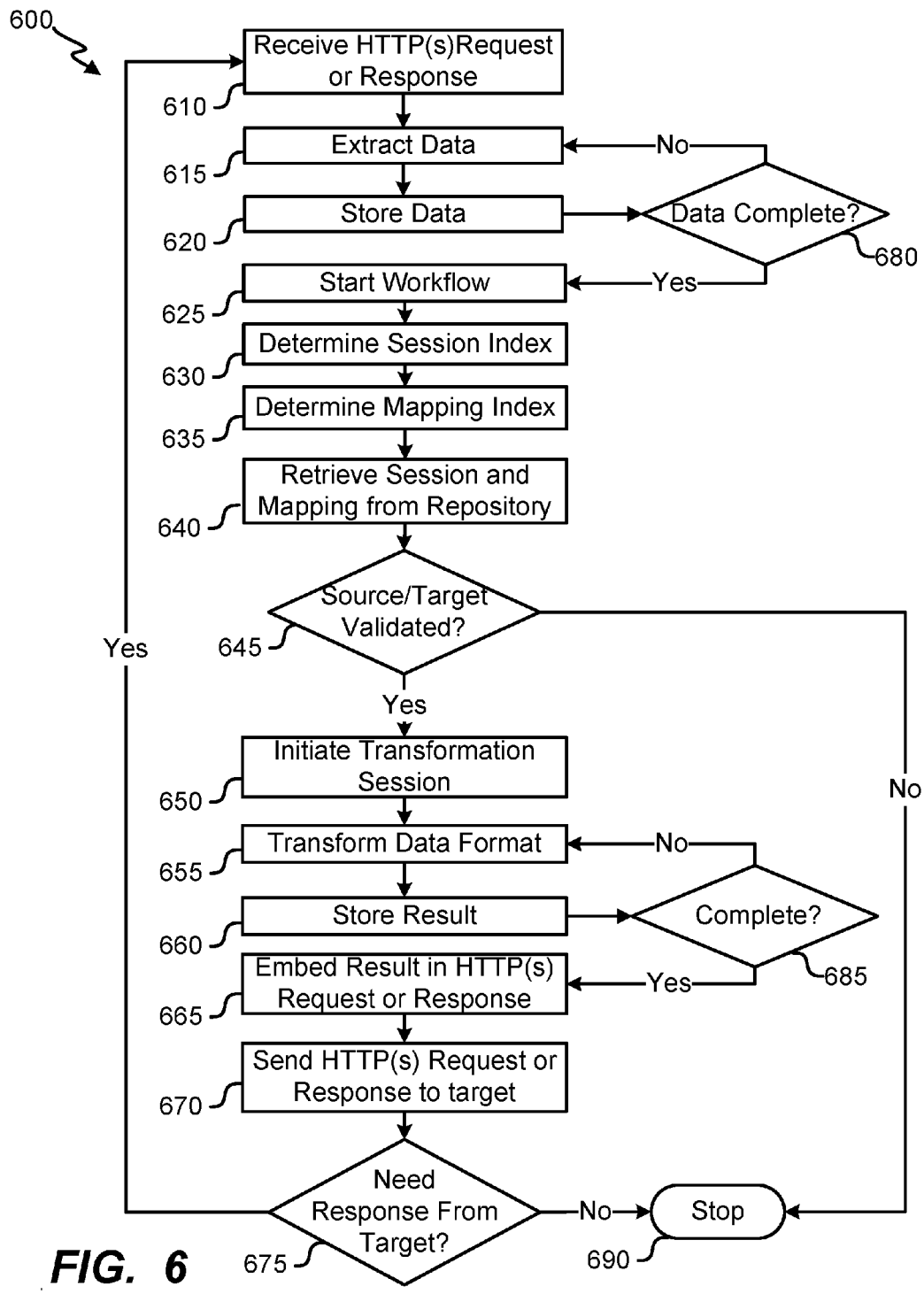
FIG. 6 illustrates a flowchart of the embodiment of a process for transforming the source data format to the target data format.

FIG. 6 illustrates a flowchart of the embodiment of a process 600 for transforming the source data format to the target data format. The data interface 365 and the user interface 320 on the chronicle platform 105 receive and transmit data in a first predetermined format. The integration platform 110 executes the process 600 for transforming the source data format to the data format configuration of the data interface 365 and the user interface 320 on the chronicle platform 105 received from the institutes 115 and the data services 180. Conversely, the data services 180 receives and transmits data in a second predetermined format and the institutes 115 transmit and receive data in a third predetermined format. The integration platform 110 also executes the process 600 for transforming the source data format to the target data format for data received by the institutes 115 and the data services 180.

Block 605 shows the start of the process 600 for transforming the source data format to the target format data. The input controller 415 on integration framework 110 receives the HTTP(s) request or response as shown in block 610. The input controller 415 extracts the data from the HTTP(s) as shown in block 615 and stores it in the source cache 420 as shown in block 620. The input controller 415 then checks to make sure that it has received all of the source data as shown in decision block 680. If the input controller 415 has not stored all of the source data it starts the extraction process again as shown in block 615. The input controller 415 will continue to check to make sure it has stored all of the source data in source cache 420 until none is remaining to store, and then the workflow processor 470 starts the workflow as shown in block 625. The workflow processor 470 calculates the session index and the mapping index as shown in blocks 630 and 635 and passes the session index and the mapping index on to the repository server 435. The repository server 435 retrieves the session from the session repository and the mapping from the mapping repository as shown in block 640. The mapping maps the source data format to the target data format. The session is a set of instructions that describe how and when to move the source data format to the target data format.

The load manager 440 validates the target and source credentials as shown in block 645 by matching them to the target and source credentials 480. If the load manager 440 cannot validate the target and source credentials the transformation process stops as shown in block 690. If the load manager 440 validates the target and source credentials it initiates the transformation session as shown in block 650 by triggering the transform manager 445 to start transforming the source data format. The transform manager 445 uses the mapping and the session to transform the source data format for data in the source cache 420 to the target data format as shown in block 655. The transform manager 445 stores the transformed data in the target cache 460 as shown in block 660. The transformation manager then checks to make sure that it has transformed and stored all of the data from the source cache 420, as shown in decision block 685. If the transform manager 445 has not transformed and stored all of the data from the source cache 420, it continues to transform the source data format as shown in block 655 and stores transformed data in the target cache 460 as shown in block 660.

The transform manager 445 iteratively checks to make sure it has transformed all of the data as shown in 685 and stored all of the transformed data in the target cache 460 as shown in blocks 655 and 660. The output controller 455 then embeds the data in the HTTP(s) request or response as shown in block 670 and transmits the data to the target. The workflow processor 470 then determines if the HTTP(s) request or response requires a response as shown in decision block 675 and generates instructions for the input controller 415. One such instance would be when the integration platform 110 sends a request for data from the data services 180. In that case integration platform 110 would need the data from the response from the data services 180 that contains the data it requested. If no response is required, the process 600 for transforming the source data format to the target data format is over as depicted at the block 690. The input controller 415 receives the HTTP(s) response as shown in block 610 if the decision block 675 makes is affirmative and the workflow processor 470 will start the transformation process from block 615 and proceed until it reaches block 690 and stops.

Figure 7A:
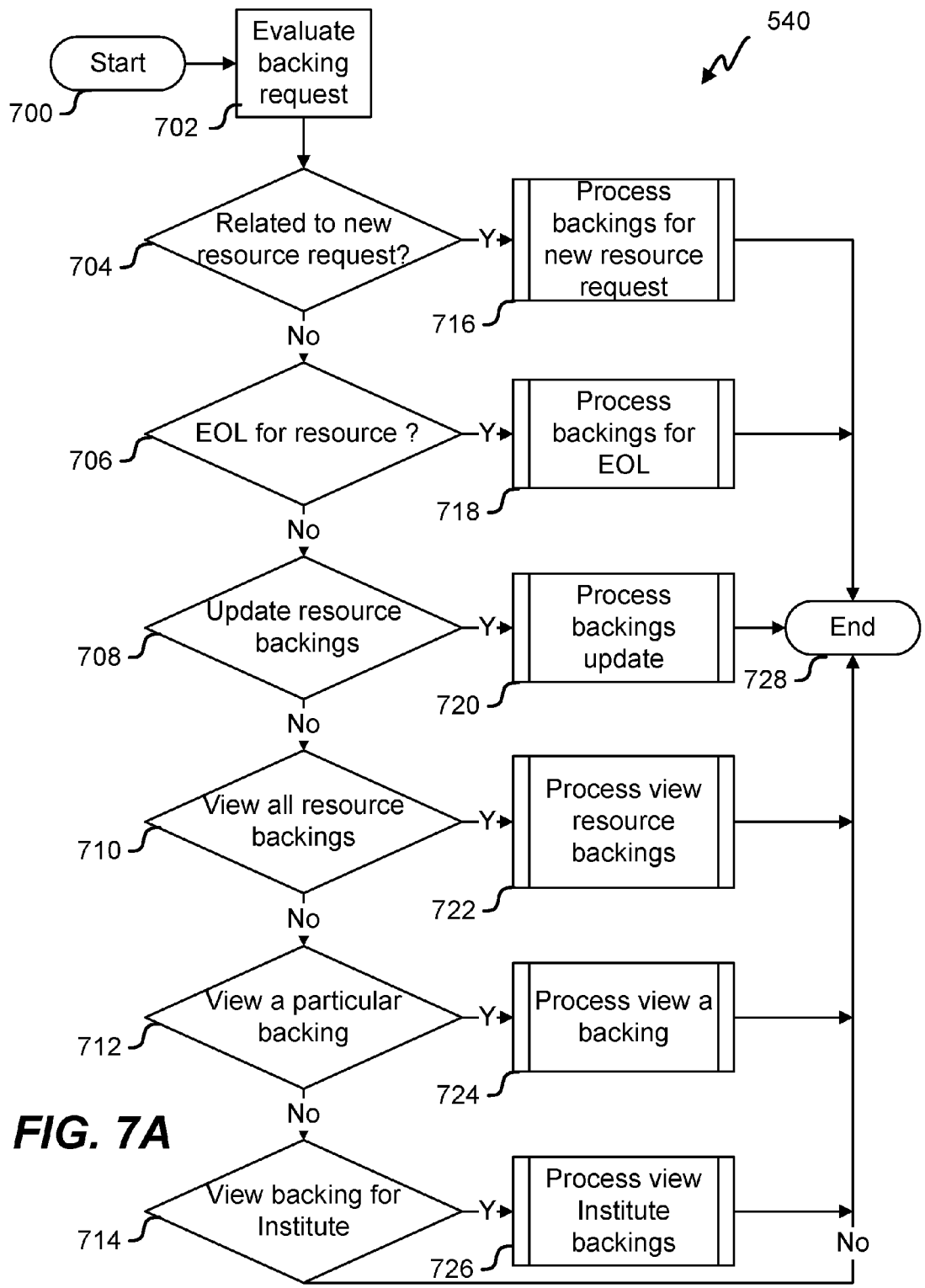
FIG. 7A Illustrates a flowchart of the embodiment of a process for managing backings.

FIG. 7A Illustrates a flowchart of an embodiment of a process for managing backings 540. Institutes 115 may require guarantees in the form of backings from one or more sources in order to grant a resource request. A backing comprises anything of value including real property, businesses, securities, bonds, CDs, bank deposits, livestock, cars, boats, airplanes, art, personal property, wine collections, or anything else of value. An institute typically adjusts the value of backings using a standard or regulated rate. In this case the total value of the all of the backings guaranteeing a resource request may be much greater than the value of the resource request. For instance, an institute may adjust a real property to 80% of its value while adjusting a piece of art to 10% of its value. On the other hand, institutes on some occasions may adjust the value of a backing using a special rate that is an override discount or premium rate that is different from a standard or regular rate. In the case of an institute overriding the standard or regular rate—the applied override discount can be more or less than the standard or regulated advance rate or the applied override premium can inflate the value of a backing. For instance, an institute may use a premium of 120% of a real estate backing value while discounting a piece of art to 10% of its value. When a backing is discounted in any way or a premium applied in any way to the backing value—the result is called an "adjustment" of the backing value. A resource request is fully backed when the accumulated adjusted values of all of its backing s are at least equal to the resource value. When the resource requestor has fully reimbursed the bank for granting the resource request, the institute releases the backing to the extent that it was guaranteeing that resource. Backings may be owned by multiple parties and each party may use their fractional ownership of the backing to back one or more resource requests. Accordingly, while a single resource request may have multiple backings guaranteeing it, a single backing may also be leveraged over multiple resource requests by multiple parties. Once a backing workflow is started at 700, the next step at step 702 is to evaluate the backing request. At step 704 if the backing request is related to an new resource request, then the process 716 for processing backings for new resource requests is initiated. If the backing request is not related to a new resource request, then the next step 706 is to determine if the request is for processing the end-of-life (EOL) of a backing for a granted resource request that has been fully compensated at process 718. If it is not—then the next step 708 is to determine if the request is to update one or more resource backings. If so, then the one or more backings are updated at process 720. If not, then at step 710 if the request is to view all of a resource's backings—then at step 722 process view resource backings is implanted. If not then step 712 determines if the request is to view a particular backing and, if so, the process 724 does that. If not, then step 714 determines if the request is to view the Institute 115 backings. If so process 726 does that and if not the process ends at step 728. Once processes 716, 718, 720, 722, 724 or 726 are finished the process also ends at step 728.

Figure 7B:
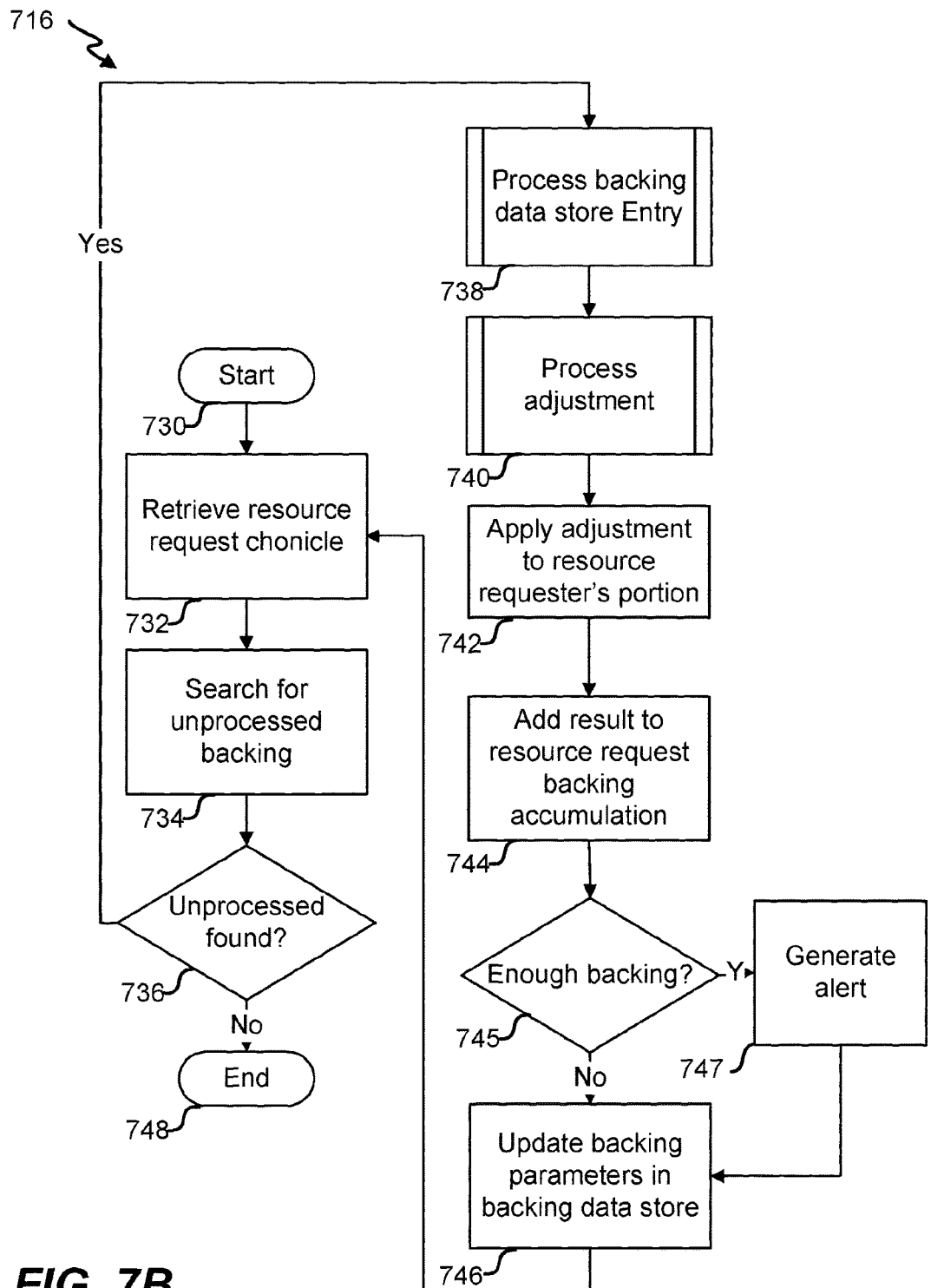
FIG. 7B Illustrates a flowchart of the embodiment of a process for managing backings for new resource requests.

FIG. 7B Illustrates a flowchart of an embodiment of a process for managing backings for new resource requests 716. Process 716 starts at step 730 and then proceeds to retrieve the resource request chronicle at step 732. Step 734 searches for unprocessed backings in the resource request chronicle. If step 734 finds no backings unprocessed—then process 716 ends at step 748. If unprocessed backings are found, then process backing data store entry 738 starts. Next, process adjustment 740 starts. When it ends, the next step 742 applies the adjustment to the resource requester's portion of the backing and accumulates the result at step 744. Step 745 determines if there is enough backing. If there is, step 747 generates an alert to a user device 205-235. Then step 746 updates the backing data store to reflect the backing adjusted value. The process starts again at step 734 determining if there is another unprocessed backing in the chronicle.

Figure 7C:
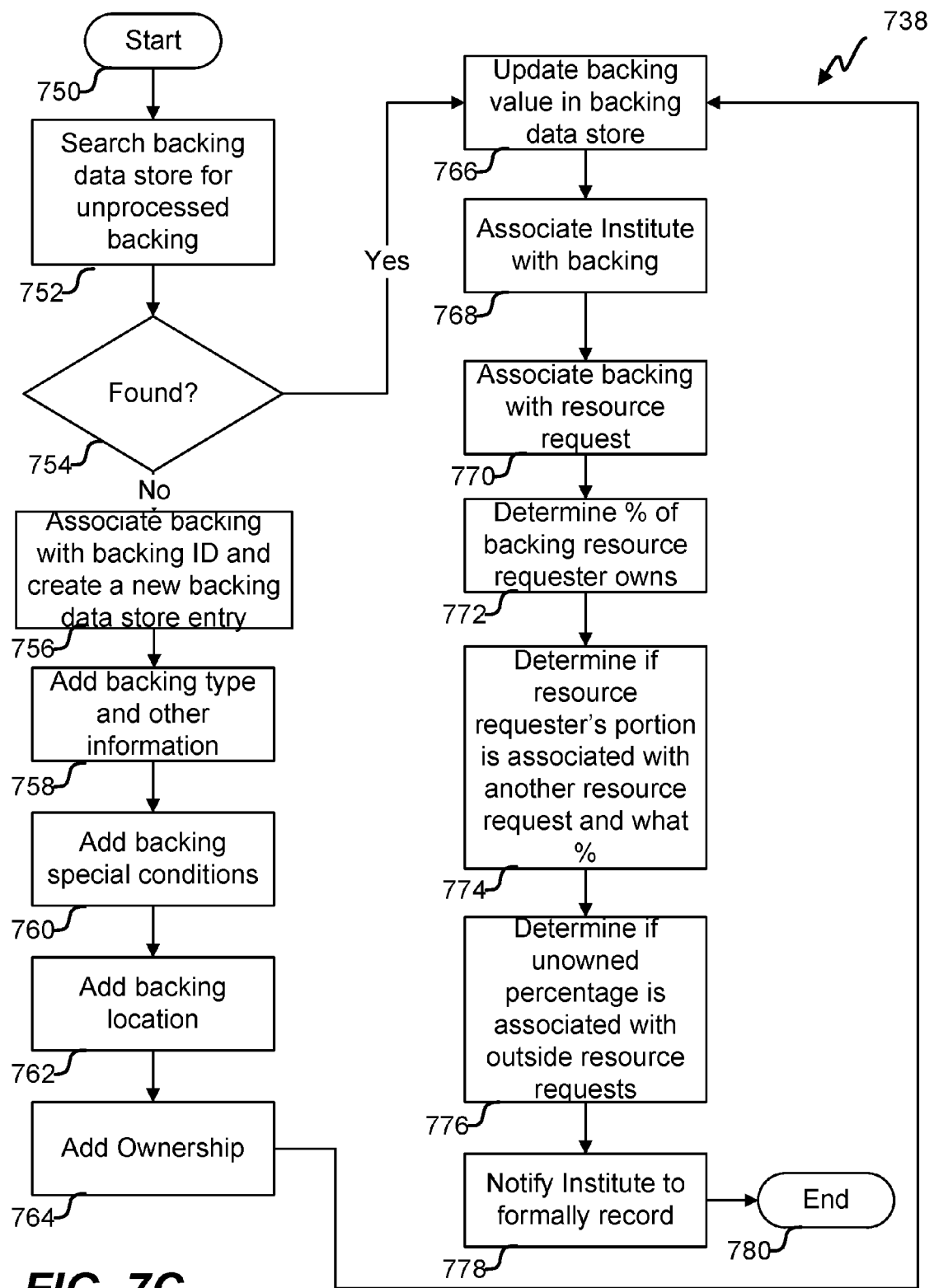
FIG. 7C Illustrates a flowchart of the embodiment of managing a backing data base.

FIG. 7C Illustrates a flowchart of an embodiment of processing a backing data store entry 738. The backing data store indexes backings in multiple ways including ownership, type, value, performance, resource request, and institute. The data store entry 738 process start at 750, and then step 752 searches the backing data store to determine if there are resource request unprocessed backing is in the backing data store. At step 754 if an unprocessed backing is found then step 766 updates the backings value in the backing data store. The updated value could have come from data services 180, the resource requestor, or any one of a number of sources. The next step 768 associates the institute with the backing followed by step 770 associating the resource request with the backing. After that, step 772 determines if the resource requestor owns all or a fractional portion of the backing. The institute will only consider that portion of the backing that the resource requestor owns to back the resource request. If, however, step 774 determines that the resource requestor's portion of the backing is also associated with another resource—then step 774 determines what percent of the resource requestor's fractional ownership is available for the current resource request. Next, step 776 determines if the portion not owned by the resource requestor is associated with any resource. Then step 778 reminds the institute to formally record the associated resource request against the backing if the resource request is granted. That ends the process at step 778. However, if back at step 754 the unprocessed backing was not found in the backing data store then step 756 creates a new entry and associates the backing with a backing identification number. Step 758 associates all other backing information such as type, insurance, etc. with the backing identification number. Step 760 associates special conditions like flood plains and earthquake zones with the backing identification number.

Step 762 associates the location of backing with the identification number and step 764 associates the resource requestor as well. At this point step 766—already discussed—is next.

Figure 7D:
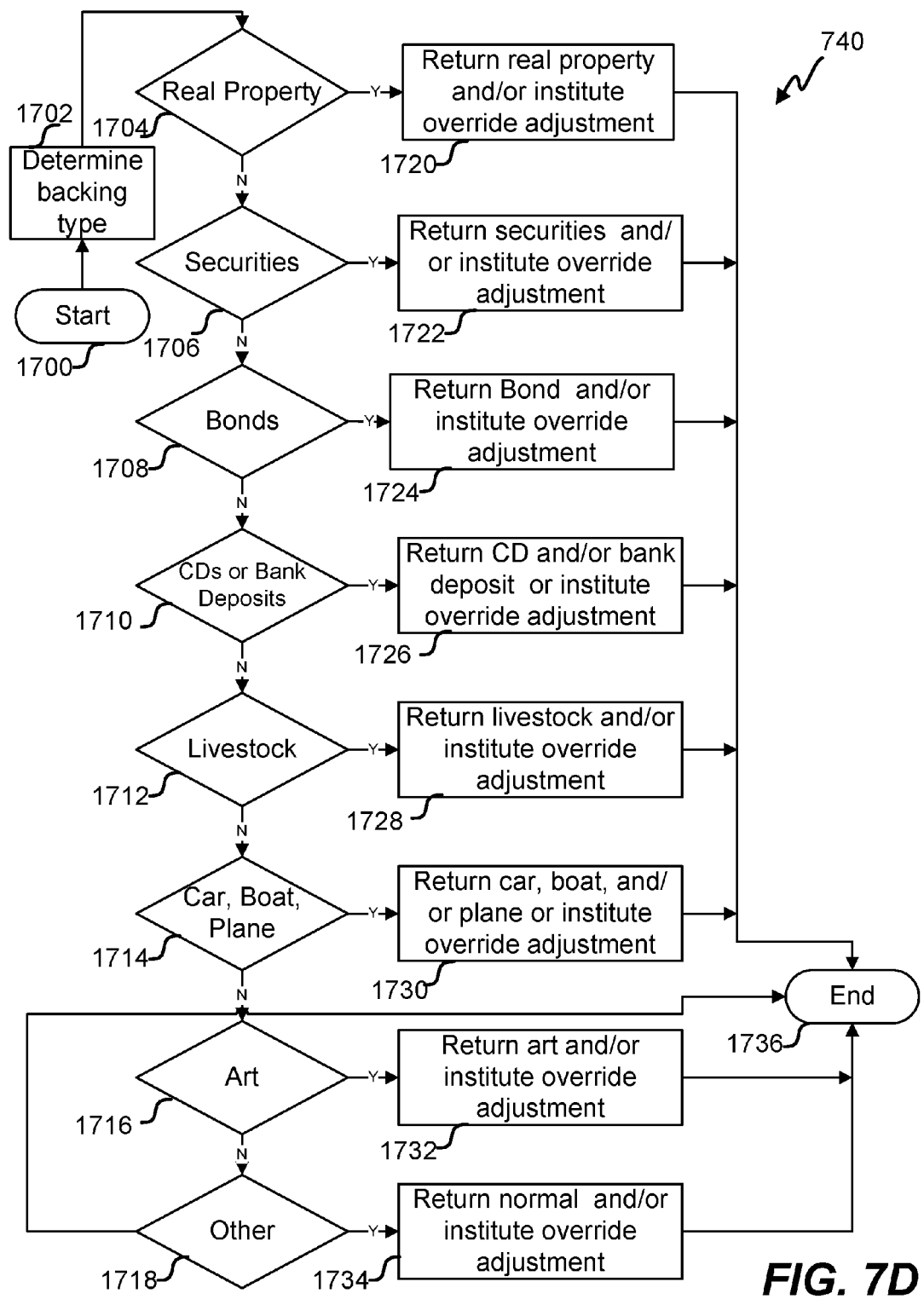
FIG. 7D Illustrates a flowchart of the embodiment of processing the advance or special rate for the backing.

FIG. 7D Illustrates a flowchart of an embodiment of processing the advance, special rate, or institute override adjustment for the backing 740. The advance or special rate is a variable the institute adjusts the backing by for guaranteeing a resource. backings can be any one of a number of types "A" thru "H", and any other type of valuable asset. The institute generally applies a different adjustment to each different type of backing. After start process 740 at step 1700, step 1702 determines what the backing type is. Step 1704 determines if it is an "A" type and if it is—then step 1720 returns the "A" and/or the override adjustment and then ends at step 1736. If not an "A" type then step 1706 checks to see if the backing is a "B" type. If so step 1722 returns the "B" and/or the override adjustment and ends at step 1736. If not a "B" type then step 1708 determines if the backing is a "C" type. If so step 1726 returns the "C" and/or override adjustment and ends at step 1736. If not a "C" type, then step 1710 determines if the backing is a "D" type, and if so, step 1726 returns the "D" and/or override adjustment and ends at step 1736. If the backing is not a "D" tuype then step 1712 determines if it is an "E" type. If so—then step 1728 returns the "E" and/or override adjustment and ends at step 1736. If the backing is an "E" type then step 1714 determines if it is "F" type and step 1728 returns the "F" and/or the override adjustment and ends at step 1736. Step 1716 determines if the backing is a "G" type. If it is then step 1732 returns the "G" type and/or the override adjustment and ends at step 1736. Finally, step 1718 determine that the backing is an "H" type. If so step 1734 determines what adjustment to return and ends at step 1736.

Figure 7E:
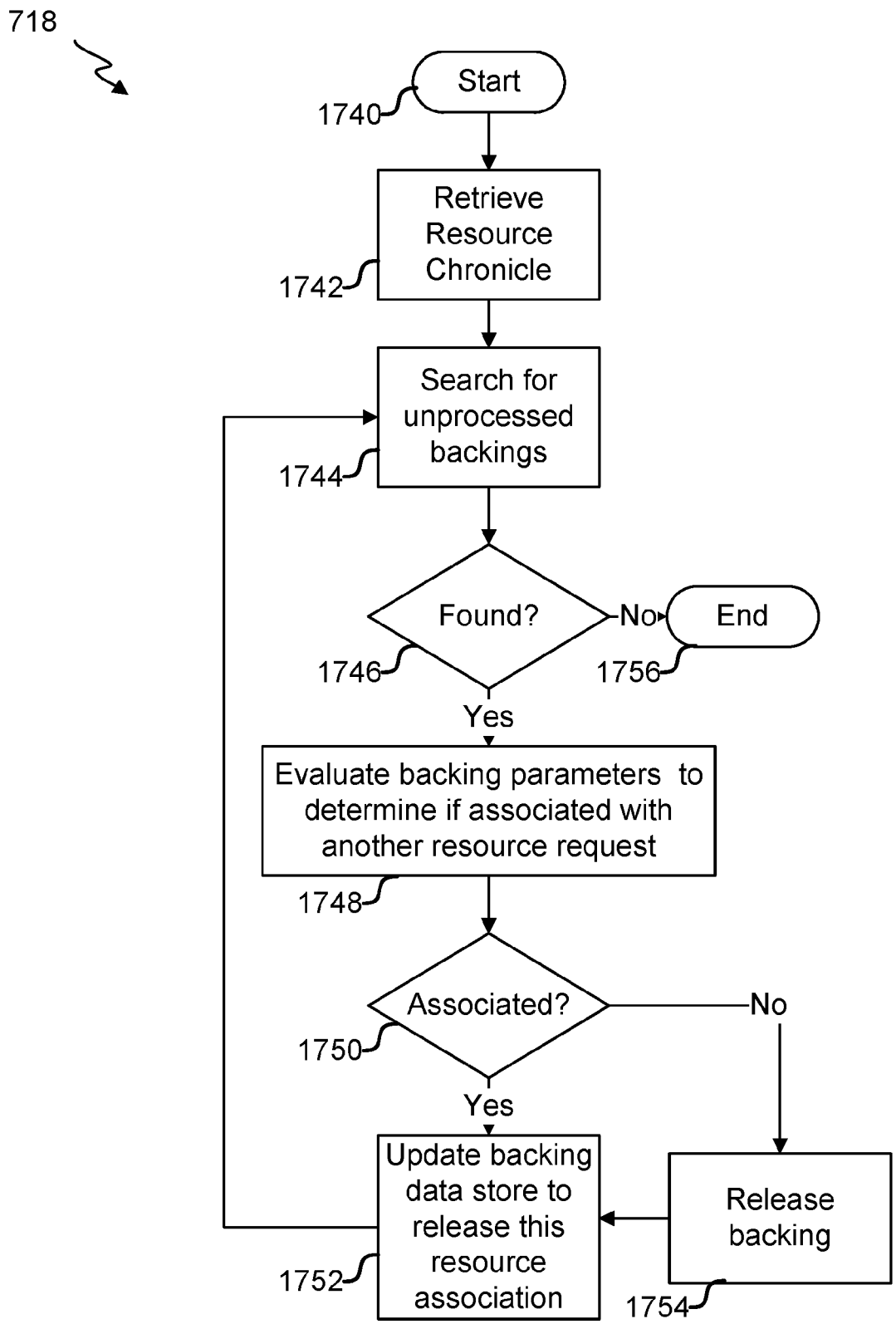
FIG. 7E Illustrates a flowchart of a process for managing backings at the end of life (EOL) of a resource.

FIG. 7E Illustrates a flowchart of a process for managing backings at the end of life (EOL) of a resource 718. When a resource requestor fulfills their obligation to an institute, the institute can release that backing as to the that resource. Since the backing may be backing other resource requests with the same institute—the institute must only release the backing if it is not backing any other resource request with that institute. If it is backing other resource requests—the institute may release the particular request from the backing. Starting at step 1740, step 1742 retrieves the resource chronicle. Then step 1744 searches for backings that have not been processed for EOL. If none are found—then there is no reason to do anything else and the process ends at step 1756. If there are backing's that have not been processed for EOL at step 1746—then step 1748 determines if the backing is guaranteeing any other resource at that institute. At step 1750—if an association is found then step 1752 updates the backing data store to indicate that the institute is releasing the backing for that resource only and returns to step 1744 to search for more backings. If no association is found at step 1750 then step 1754 releases the backing altogether and proceeds to step 1752.

Figure 7F:
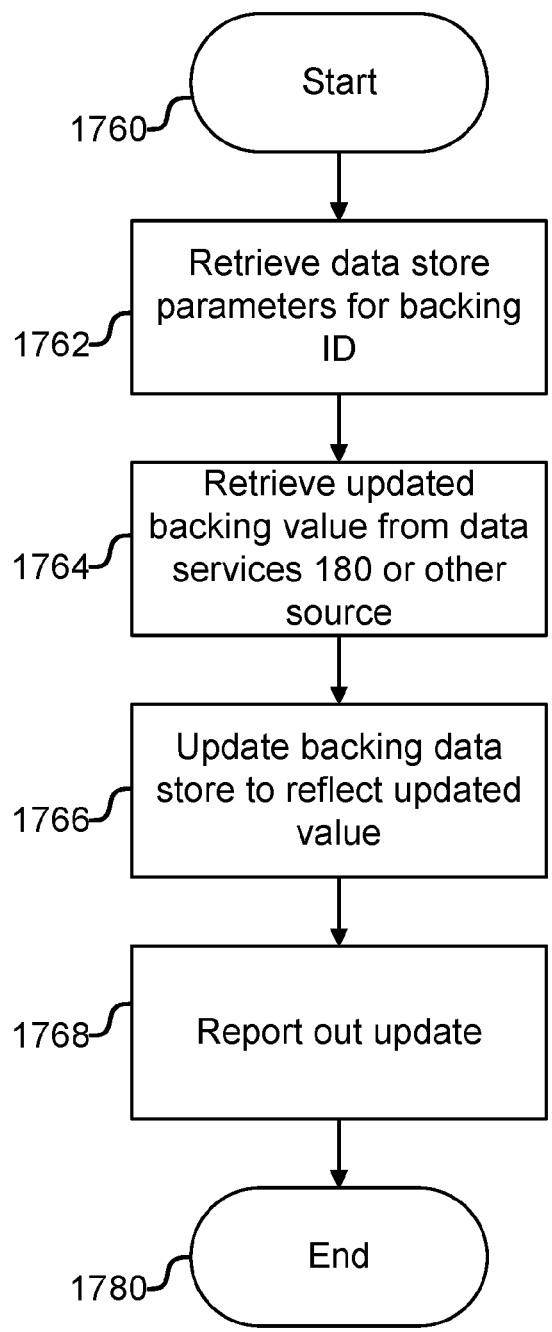
FIG. 7F Illustrates a flowchart of a process for updating the value of a backing.

FIG. 7F Illustrates a flowchart of a process for updating the value of a backing 720. Institutes periodically or for many different reasons update the value of backings when necessary for processing requests. Data services 180 may provide an updated value for a backing. A flood or other disaster may hit an entire area triggering process 720 to update real property in the affected area, for instance. Process 720 starts at step 1760. Step 1762 retrieves the data store parameters for the backing. Step 1764 retrieves the updated backing value from data services 180 or other source or applies a given value. Step 1766 then updates the backing database to reflect the updated value. Step 1768 reports out the updated value to all institutes that are associate with the backing and ends at step 1780.

Figure 7G:
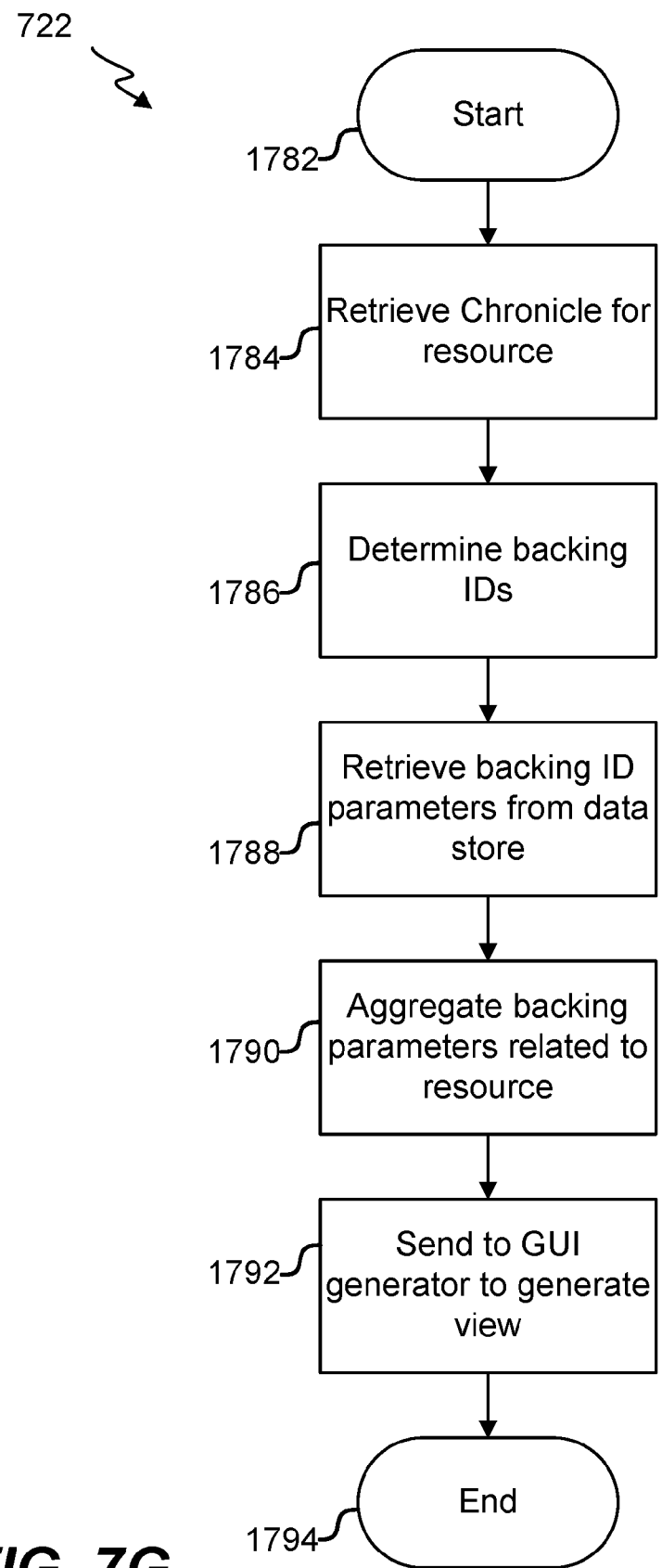
FIG. 7G Illustrates a flowchart of a process for providing a view of the backings for a resource request.

FIG. 7G Illustrates a flowchart of a process for providing a view of the backings for a resource request 722. The backing management process 540 may provide different perspectives of the backings in the backing data store. One of those perspectives is from the point of view of the resource request so that all backings guaranteeing the resource request can be easily viewed and evaluated. The process 722 starts at step 1782. Step 1784 retrieves the chronicle for the resource. Step 1786 determines the backing identification numbers for all of the backings backing the resource. Step 1788 retrieves the parameters of those identification numbers from the backing data store. Step 1790 aggregates the backing parameters. Step 1792 sends the aggregation to the GUI generator 555 to generate the view of the aggregation. Step 1794 is the end.

Figure 7H:
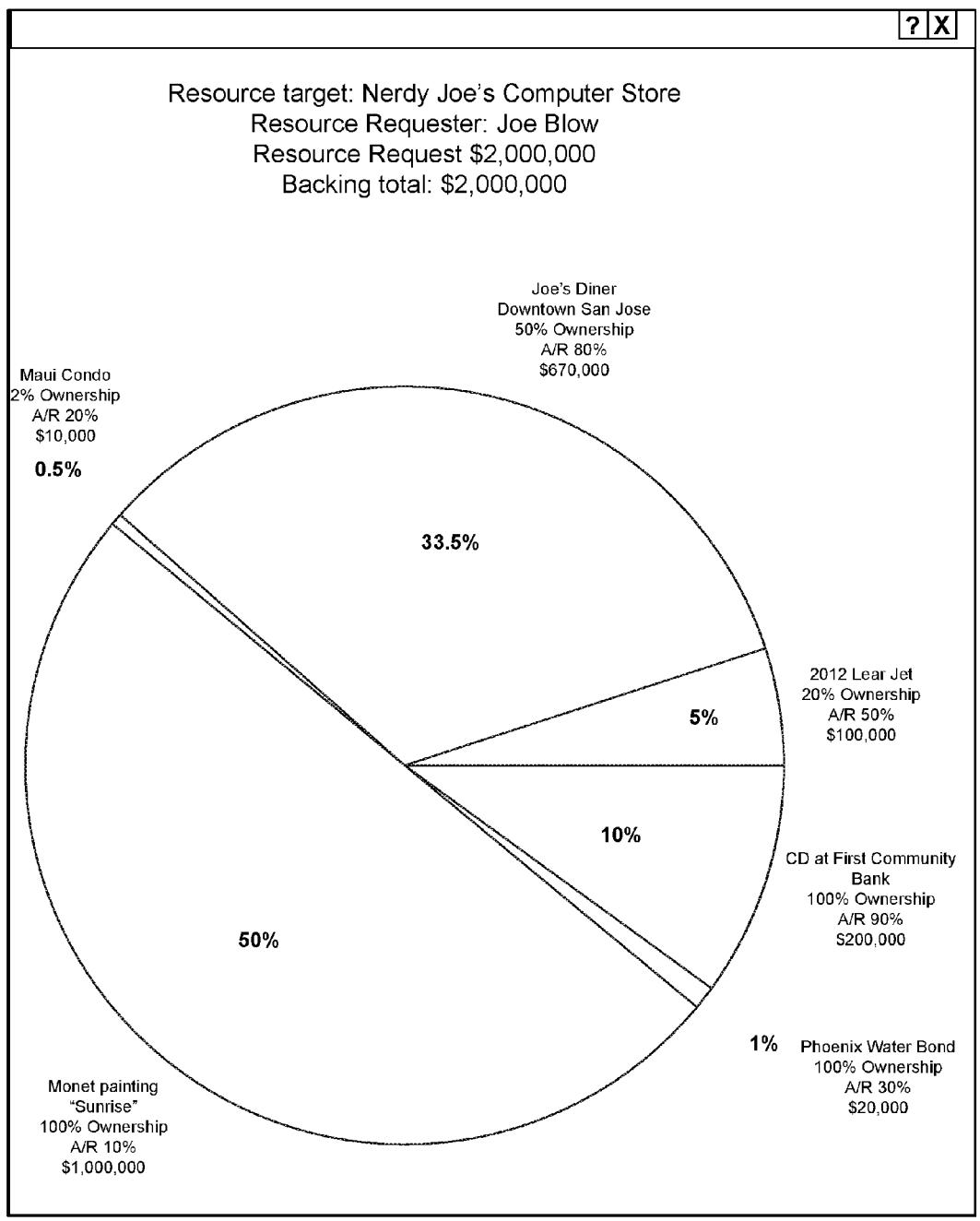
FIG. 7H Illustrates a screen shot of backings for a resource request.

FIG. 7H Illustrates a representative screen shot of one possible view of many possible vies of the backings for a resource request of $2 M for Joe Blow to buy Nerdy Joe's Computer Store. The screen shot shows that there are six backings used to generate $2 M in backing for the request: a 2% ownership in a Mau Condominium; a 50% ownership in Joe's Diner in San Jose; a 20% ownership in a 2012 Lear Jet, 100% ownership in a CD at First Community Bank; 100% ownership of a Phoenix water bond; and a 100% ownership of Monet's famous "Sunrise" painting.

Figure 7I:
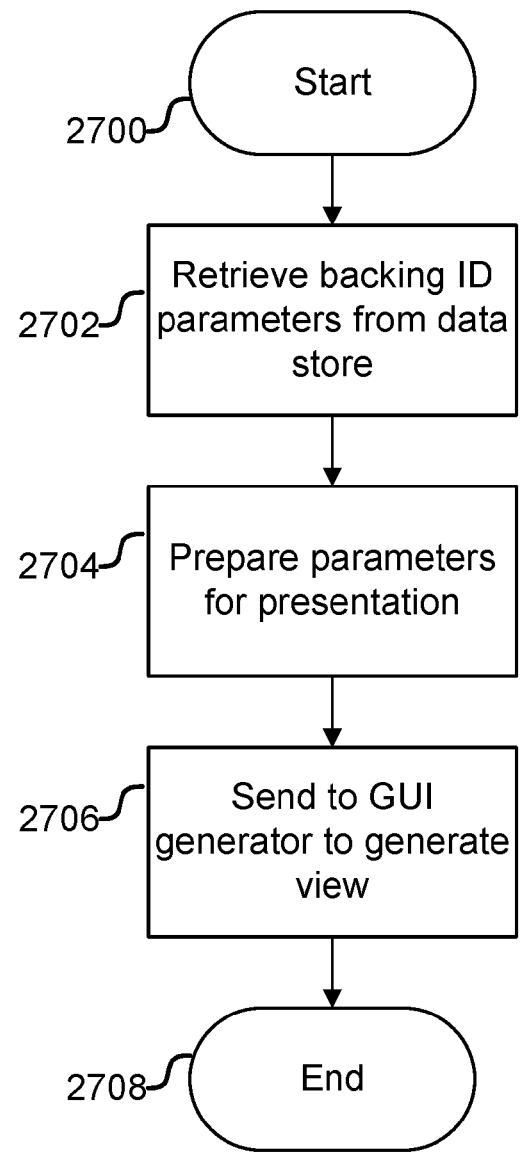
FIG. 7I Illustrates a flowchart of a process for providing a view of the backing.

FIG. 7I Illustrates a flowchart of a process for providing a view of a backing 724. Another view that backing management process 540 provides is of the backing itself. The process 724 starts step 2700. Step 2702 retrieves the backing identification number parameters from the backing data store. Step 2704 prepares the parameters for presentation and then step 2705 sends the parameters to the GUI generator to generate the view before ending at step 2708.

Figure 7J:
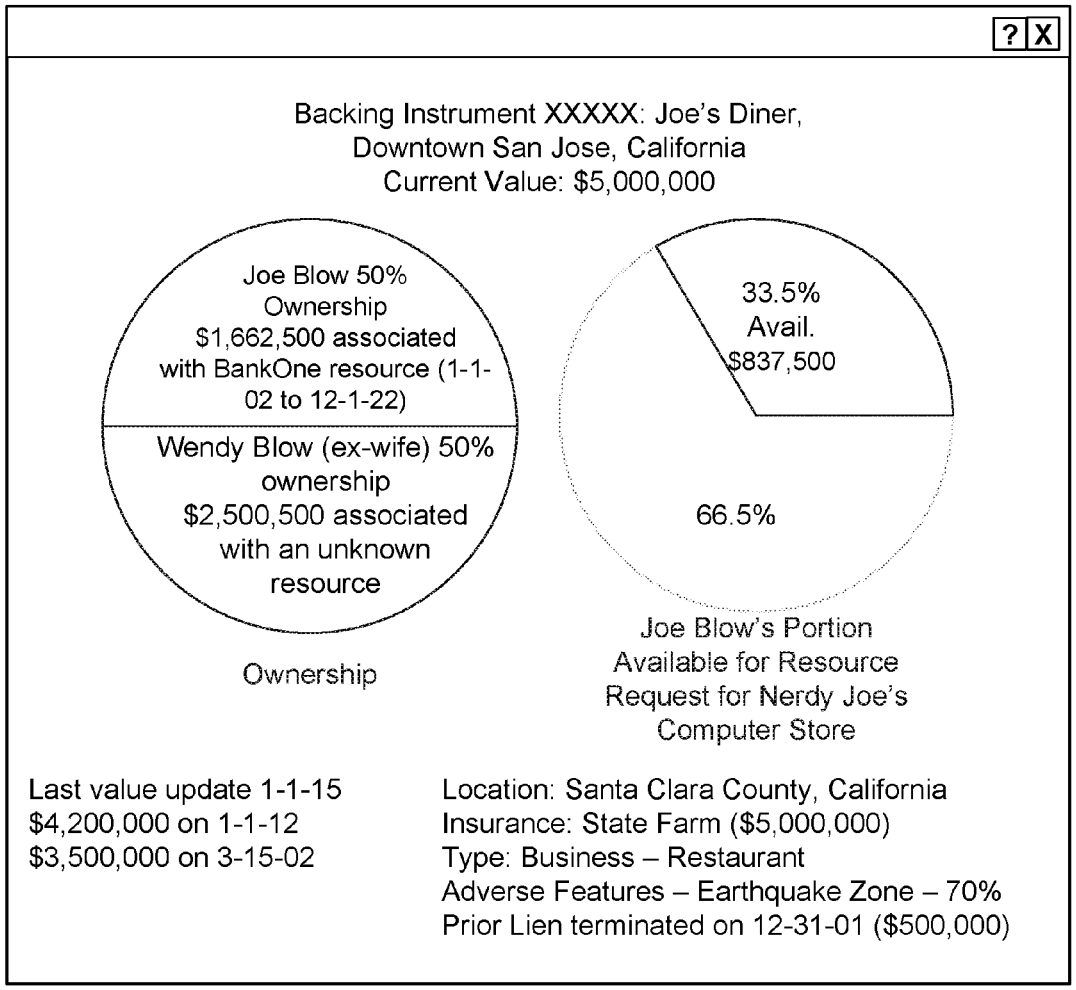
FIG. 7J Illustrates a screen shot of a backing.

FIG. 7J Illustrates one representative screen shot of many possible screen shots of a backing, Joe's Diner used to back Joe Blow's request for $2 M to buy Nerdy Joe's Computer Store. The screen shot shows that Joe Blow owns Joe's Diner in equal shares with his ex-wife Wendy Blow. It shows that his 50% ownership is already associated with a BankOne resource of $1,662,500 that will go away on Jan. 1, 2022. The screen shot also shows the last time the value was updated as well as the previous two times it was updated, the location, the associated insurance, the type of asset it is, that it has an adverse feature because it is in an earthquake zone rated at 70%, and one terminated loan with date of termination and amount.

Figure 7K:
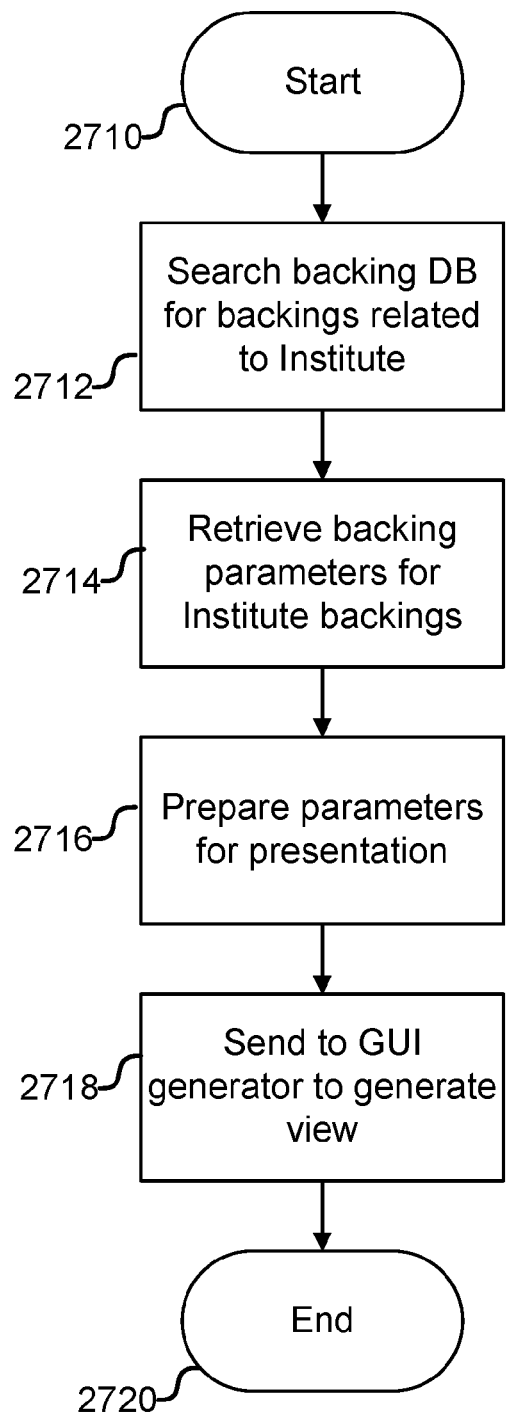
FIG. 7K Illustrates a flowchart of a process for providing a view of the institutes backings, FIG. 7L Illustrates a screen shot of the institutes backings.

FIG. 7K Illustrates a flowchart of a process for providing a view of the institutes backings 726. Another perspective view provided by the backing manager process 540 is that of all backings associated with the single institution. Institutions or outside evaluators need a rich view of the backings in their portfolio. The way that a backing is processed and stored makes it possible for the backing manager process 540 to provide this view. The process starts at step 2710, and step 2712 searches the backing data store for all backing identification numbers related to the institute. Step 2714 then retrieves all of the parameters for those identification numbers. Step 2716 prepares the parameters for presentation, and step 2718 sends them to the GUI generator to generator a view of one or more of the parameters. The process ends at step 2720.

Figure 7L:
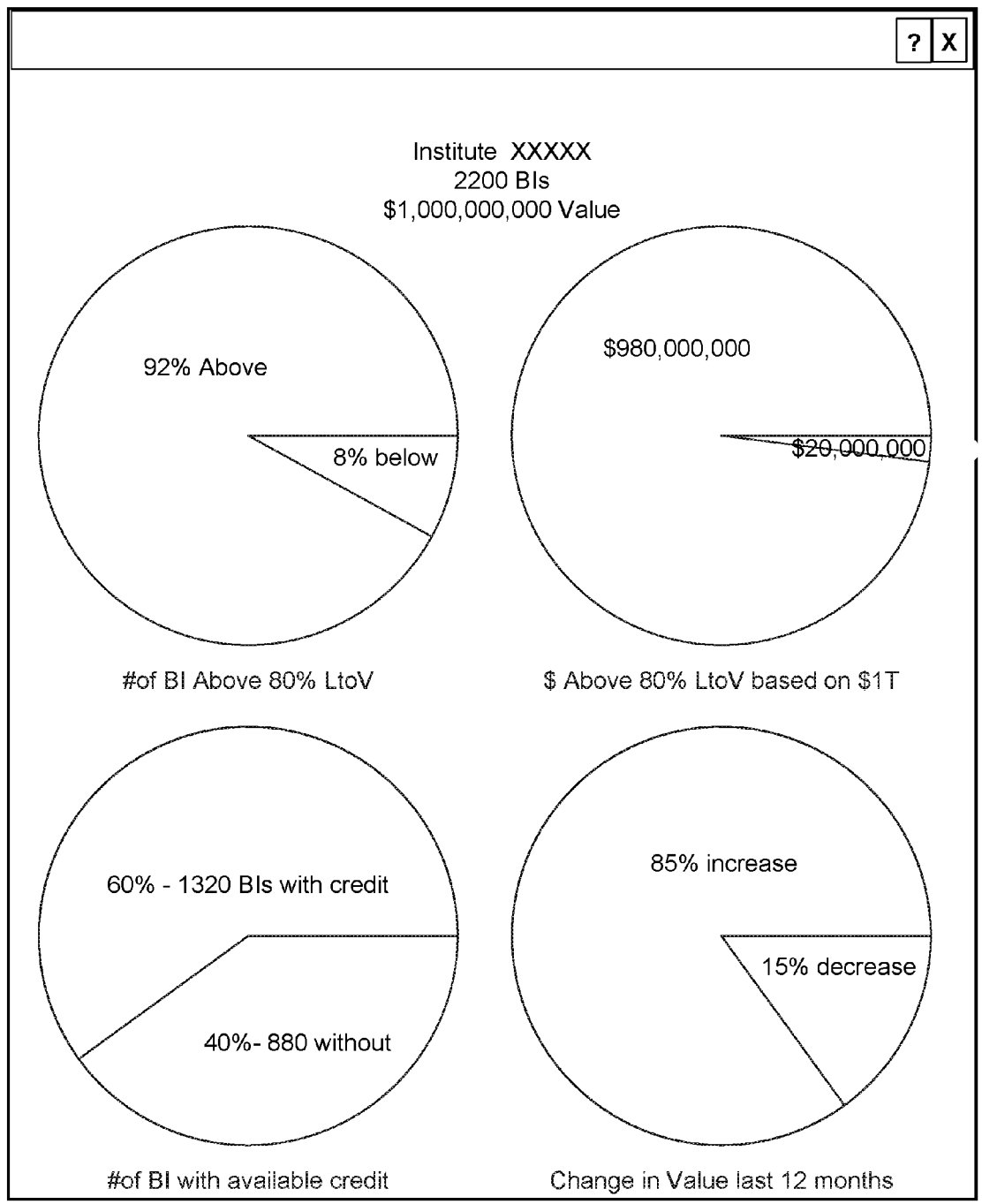

FIG. 7L Illustrates one screen shot of many possible screen shots of the institutes backings. This screen shot shows various information about the institutes backings.

First—the institute shows that it has 2200 backings and that value. It shows that how many are at a specific value. It also shows that 1320 backings have availability and the value of 85% of backings have increased in the last 12 months. An institute can use this information to offer customers additional resource services based on the unused credit on their backings. The bank can also use this aggregated data for many other reasons—including to upsell resources or downplay resource offerings if they are overexposed.

Figure 8:
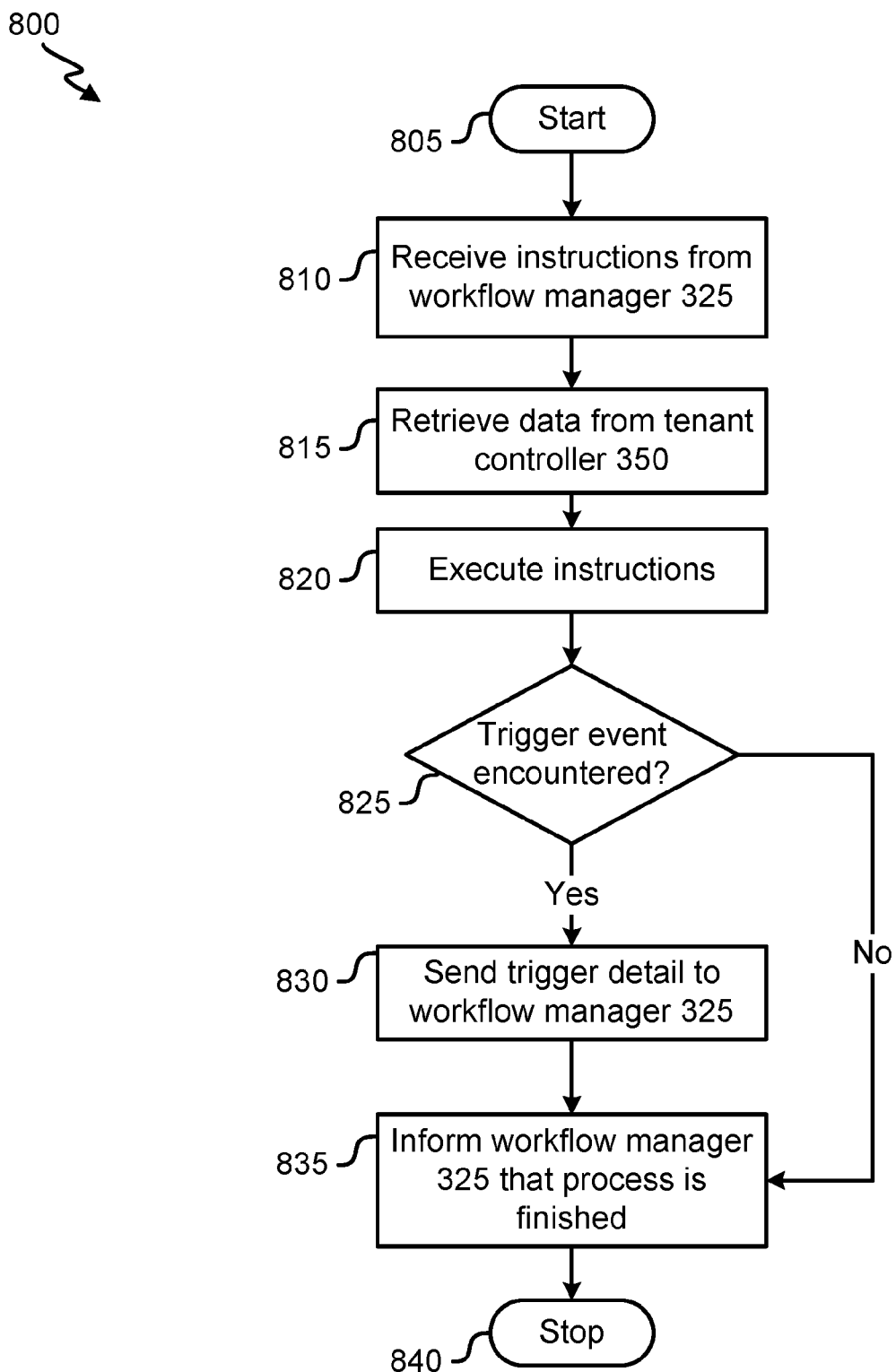
FIG. 8 illustrates a flowchart of the embodiment of a process for processing a resource request.

FIG. 8 illustrates the flowchart of an embodiment of a process 800 for processing a resource request. When the workflow manager 325 detects a trigger to process a resource request (in full or in part), it creates the instructions the chronicle processor 385 needs to process the resource request and sends them to the chronicle processor 385 as shown in block 810. The chronicle processor 385 retrieves the data it needs to process the chronicle, such as a credit report from extension service 135, as shown in block 815. The chronicle processor 385 executes the instructions as shown in block 820. At block 825, it is determined whether processing the resource request according to the instructions causes another triggering event. If so, the chronicle processor 385 sends the trigger detail to the workflow manager 325 as shown in block 830. Upon completion of sending the trigger detail or determining that another triggering event has not been encountered, the chronicle processor 385 informs the workflow manager 325 that it has finished as depicted in block 835. The process 800 is finished as shown in block 840.

Figure 9:
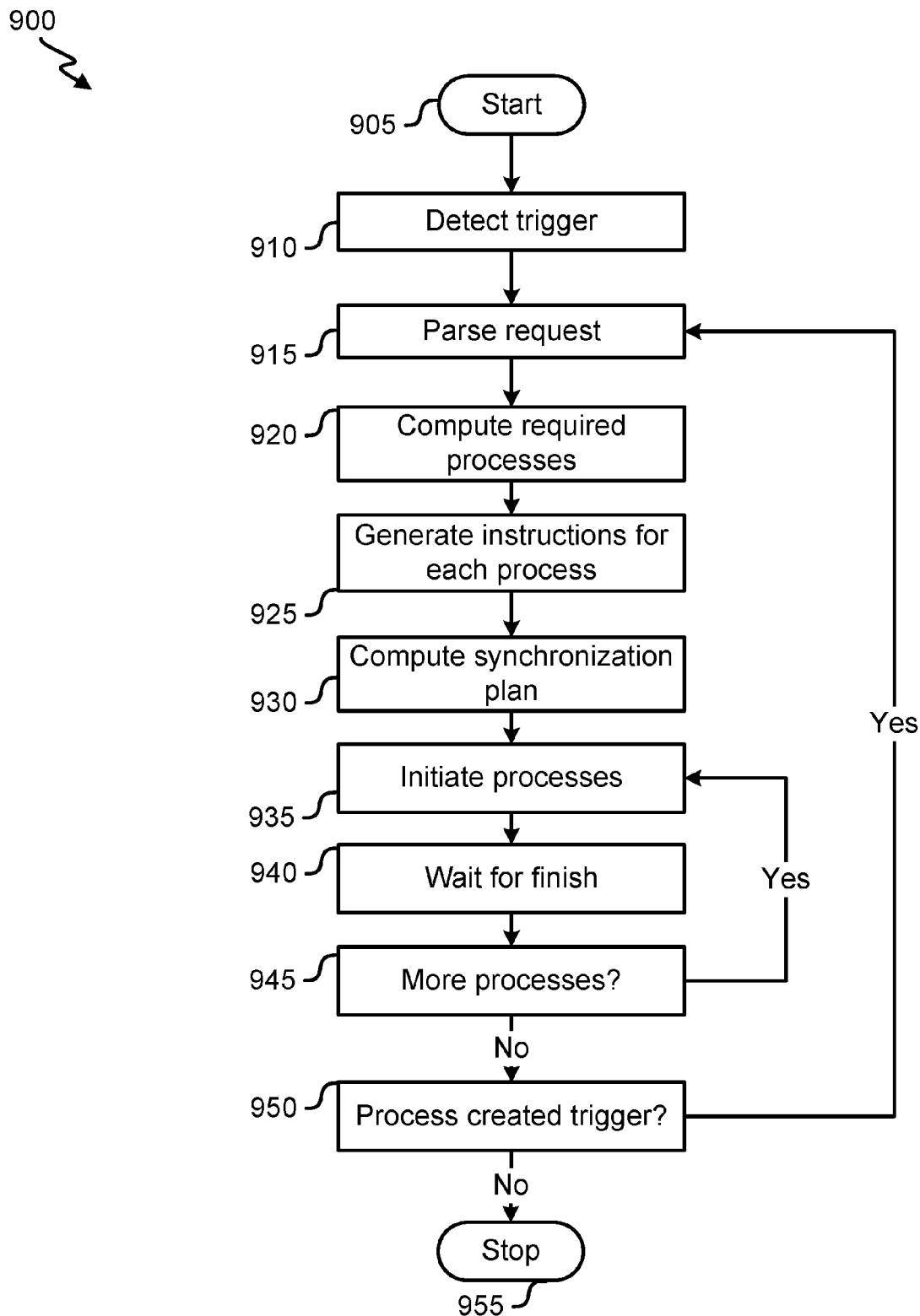
FIG. 9 illustrates the flowchart of the embodiment of a workflow manager processing a workflow.

FIG. 9 illustrates the flowchart of an embodiment of a process 900 for workflow management. When the workflow manager 325 detects a trigger to process a workflow request as shown in block 910, it parses the workflow request as shown in block 915. Because the workflow manager 325 detects triggers generated by processes internal to the chronicle platform 105 and external to it from institutes 115 and/or data services 180, the workflow manager 325 parses triggers from both sources. Once parsed, the workflow manager 325 computes which of the GUI generator 375, the data aggregator 380, the chronicle processor 385, the backing processor 390, and the version generator 395 processes are needed to resolve the workflow request as shown in block 920.

For each of the processes needed to resolve the workflow request, the workflow manager 325 generates a set of instructions as shown in block 925. The workflow manager 325 then computes a synchronization plan as shown in block 930. For instance, if the workflow request is to capture a version of the resource memorandum, the workflow manager 325 is to start the chronicle processor 385 before starting the version generator 395. There are processes that can run simultaneously, for instance the GUI generator 375 can simultaneously process the presentation for reporting receiving a credit report while version generator 395 captures the second version of the resource memorandum. The workflow manager 325 initiates the process according the synchronization plan as shown in block 935. The workflow manager 325 waits for the initiated processes to finish as shown in block 940. Once the initiated process report they are finished, the workflow manager 325 then determines if more processes are to be initiated as shown in block 945. The workflow manager 325 initiates those processes as shown in block 935. This might occur, for instance, if the chronicle processor 385 executes instructions that fill the chronicle with all required content objects to trigger a report to institutes 115 an to capture a version of the resource memorandum. Once there are no processes left to initiate, the workflow manager 325 detects new triggers that the processes generated as shown in block 950. If the workflow manager 325 detects triggers it parses those workflow requests as shown in block 915 and repeat the process 900 until there are no processes to initiate and no triggers detected as shown in in block 955.

We fully incorporate by reference herein for all purposes: U.S. Provisional Application No. 61/714,647, filed on Oct. 16, 2012; U.S. Provisional Application No. 61/652,970, filed on May 30, 2012; U.S. Provisional Application No. 61/652,977, filed on May 30, 2012; U.S. Provisional Application No. 61/792,011, filed on Mar. 15, 2013; U.S. Provisional Application No. 62/032,239, filed on Aug. 1, 2014; U.S. Provisional Application No. 62/102,196, filed on Jan. 12, 2015; U.S. Provisional Application No. 62/187,487, filed on Jul. 1, 2015; U.S. patent application Ser. No. 14/713,899 filed on May 15, 2015; U.S. patent application Ser. No. 14/590,714 filed on Jan. 6, 2015; U.S. Pat. No. 9,098,875 issued Aug. 4, 2015; U.S. Pat. No. 9,098,875 issued Aug. 4, 2015; U.S. Pat. No. 9,082,151 issued Jul. 14, 2015; U.S. Pat. No. 8,762,376 issued Jun. 24, 2014; and U.S. Pat. No. 8,572,083 issued Oct. 29, 2013.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interacting with actual hardware in a meaningful way. Examples of the physical layer include Ethernet, FDDI, B8ZS, V.35, V.24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

I claim:

1. A system for automatically managing backing for resource requests, the system comprising:
   a resource request, wherein the resource request is made by a requester;
   a backing data store, wherein the backing data store comprises:
      a first backing, wherein the first backing is associated with a first financial services provider;
      a second backing, wherein the second backing is not associated with the first financial services provider;
      a first backing parameters, wherein the first backing parameters comprises a first backing type, a first backing value, a first requester ownership fraction, and a first encumbered fraction; and
      a second backing parameters, wherein the second backing parameters comprises a second backing type, a second backing value, a second requester ownership fraction, and a second encumbered fraction;
   a resource chronicle, wherein the resource chronical is associated with the resource request, and wherein the resource chronicle comprises:
      a resource value;
      a first adjustment value;
      a second adjustment value; and
      a predetermined threshold, wherein the predetermined threshold is associated with the resource request;
   a backing manager, running on one or more processors, configured to:
      retrieve the resource value from the resource chronicle;
      retrieve the first backing from the backing data store,
      retrieve the first backing parameters from the backing data store;
      retrieve the first adjustment value based on the first backing type, from the resource chronicle; and
      reduce the first backing value by the first adjustment value, the first requester ownership fraction, and the first encumbered fraction to produce a first amount, wherein the first amount represents a first reduced value of the first backing that is available to back the resource request;
   retrieve the second backing from the backing data store,
   retrieve the second backing parameters from the backing data store;
   retrieve the second adjustment value, based on the second backing type, from the resource chronicle; and
   reduce the second backing value by the second adjustment value, the second requester ownership fraction, and the second encumbered fraction to produce a second amount, wherein the second amount represents a second reduced value of the second backing that is available to back the resource request; and
   a backing accumulator coupled to the backing manager, wherein:
   the first amount and the second amount are accumulated in the backing accumulator to form a third amount;
   the backing manager is further configured to:
   retrieve the predetermined threshold;
   compare the third amount with the resource value to generate a compared value;
   analyze the compared value to determine the compared value is greater than or equal to the predetermined threshold to create an approval;
   send an alert, over the network, to an approval device, wherein the alert indicates the approval and triggers the approval device to initiate further processing of the resource request; and
   store the approval in the resource chronicle.

2. The system for automatically managing backing for resource requests of claim 1, the system further comprising:
   a resource requester device; and
   an agent device configured to transmit the approval to the resource requester device.

3. The system for automatically managing backing for resource requests of claim 1, wherein:
   the requester owns, entirely, the first backing or owns, entirely, the second backing; or
   the requester owns, entirely, the first backing and owns, entirely, the second backing.

4. The system for automatically managing backing for resource requests of claim 1, wherein the first encumbered value and or the second encumbered value is zero.

5. The system for automatically managing backing for resource requests of claim 1, wherein the first backing type and the second backing type are each one of real property, personal property, securities, treasury notes, and/or motor vehicles including automobiles, motor homes boats an airplanes.

6. The system for automatically managing backing for resource requests of claim 1, wherein the-resource request is for a request for a residential, commercial, student, automobile, or personal loan.

7. The system for automatically managing backing for resource requests of claim 6, the system further comprising:
   a resource requester device; and
   an agent device configured to transmit the approval to the resource requester device.

8. A computer processor implemented method for automatically managing backing for resource requests, the method comprising:
   receiving a resource request from a requester;
   retrieving, from a resource chronicle, wherein the resource chronicle is associated with the resource request:
      a resource value;
      a first adjustment value;
      a second adjustment value; and
      a predetermined threshold, wherein the predetermined threshold is associated with the resource request;
   retrieving, from a backing data store:
      a first backing, wherein the first backing is associated with a first financial services provider;
      a second backing, wherein the second backing is not associated with the first financial services provider;
      a first backing parameters, wherein the first backing parameters comprises a first backing type, a first backing value, a first requester ownership fraction, and a first encumbered fraction; and
      a second backing parameters, wherein the second backing parameters comprises a second backing type, a second backing value, a second requester ownership fraction, and a second encumbered fraction;
   reducing the first backing value by the first adjustment value, the first requester ownership fraction, and the first encumbered fraction to produce a first amount, wherein the first amount represents a first reduced value of the first backing that is available to back the resource request;
   reducing the second backing value by the second adjustment value, the second requester ownership fraction, and the second encumbered fraction to produce a second amount, wherein the second amount represents a second reduced value of the second backing that is available to back the resource request; and
   accumulating the first amount and the second amount in a backing accumulator to form a third amount;
   comparing the third amount with the resource value to generate a compared value;
   analyzing the compared value to determine the compared value is greater than or equal to the predetermined threshold to create an approval;
   sending an alert, over the network, to an approval device, wherein the alert indicates the approval and triggers the approval device to initiate further processing of the resource request; and
   storing the approval in the resource chronicle.

9. The computer processor implemented method for automatically managing backing for resource requests of claim 8, the computer processor implemented method further comprising:
   transmitting, by an agent device the approval to a resource requester device.

10. The computer processor implemented method for automatically managing backing for resource requests of claim 8, wherein:
   the requester owns, entirely, the first backing or owns, entirely, the second backing; or
   the requester owns, entirely, the first backing and owns, entirely, the second backing.

11. The computer processor implemented method for automatically managing backing for resource requests of claim 8, wherein the first encumbered value and or the second encumbered value is zero.

12. The computer processor implemented method for automatically managing backing for resource requests of claim 8, wherein the first backing type and the second backing type are each one of real property, personal property, securities, treasury notes, and/or motor vehicles including automobiles, motor homes boats an airplanes.

13. The computer processor implemented method for automatically managing backing for resource requests of claim 8, wherein the resource request is for a request for a residential, commercial, student, automobile, or personal loan.

14. The computer processor implemented method for automatically managing backing for resource requests of claim 13, the computer processor implemented method further comprising:
   transmitting, from an agent device, the approval to a resource requester device.

15. A non-transitory computer-readable medium having sets of instructions stored thereon for automatically managing backing for resource requests which, when executed by a computer, cause the computer to:
   receive a resource request from a requester;
   retrieve, from a resource chronicle, wherein a resource chronicle is associated with the resource request:
      a resource value;
      a first adjustment value;
      a second adjustment value; and
      a predetermined threshold, wherein the predetermined threshold is associated with the resource request;
   retrieve, from a backing data store:
      a first backing, wherein the first backing is associated with a first financial services provider;
      a second backing, wherein the second backing is not associated with the first financial services provider;
      a first backing parameters, wherein the first backing parameters comprises a first backing type, a first backing value, a first requester ownership fraction, and a first encumbered fraction; and
      a second backing parameters, wherein the second backing parameters comprises a second backing type, a second backing value, a second requester ownership fraction, and a second encumbered fraction;
   reduce the first backing value by the first adjustment value, the first requester ownership fraction, and the first encumbered fraction to produce a first amount, wherein the first amount represents a first reduced value of the first backing that is available to back the resource request;
   reduce the second backing value by the second adjustment value, the second requester ownership fraction, and the second encumbered fraction to produce a second amount, wherein the second amount represents a second reduced value of the second backing that is available to back the resource request; and
   accumulate the first amount and the second amount in a backing accumulator to form a third amount;
   compare the third amount with the resource value to generate a compared value;

analyze the compared value to determine the compared value is greater than or equal to the predetermined threshold;

send an alert, over the network, to an approval device, wherein the alert indicates the approval and triggers the approval device to initiate further processing of the resource request; and store the approval in the resource chronicle.

16. The non-transitory computer-readable medium having sets of instructions stored thereon for automatically managing backing for resource requests of claim 15 which, when executed by the computer, further cause the computer to transmit, by an agent device the approval to a resource requester device.

17. The non-transitory computer-readable medium having sets of instructions stored thereon for automatically managing backing for resource requests of claim 15, wherein:

the requester owns, entirely, the first backing or owns, entirely, the second backing; or the requester owns, entirely, the first backing and owns, entirely, the second backing.

18. The non-transitory computer-readable medium having sets of instructions stored thereon for automatically managing backing for resource requests of claim 15, wherein the first encumbered value and or the second encumbered value is zero.

19. The non-transitory computer-readable medium having sets of instructions stored thereon for automatically managing backing for resource requests of claim 15, wherein the first backing type and the second backing type are each one of real property, personal property, securities, treasury notes, and/or motor vehicles including automobiles, motor homes boats an airplanes.

20. The non-transitory computer-readable medium having sets of instructions stored thereon for automatically managing backing for resource requests of claim 15, wherein the-resource request is for a request for a residential, commercial, student, automobile, or personal loan.

* * * * *